United States Patent
Koguchi et al.

(10) Patent No.: US 12,279,046 B2
(45) Date of Patent: Apr. 15, 2025

(54) IMAGING DEVICE, IMAGING METHOD, AND IMAGING PROGRAM

(71) Applicant: FUJIFILM Corporation, Tokyo (JP)

(72) Inventors: Takehiro Koguchi, Saitama (JP); Shinya Fujiwara, Saitama (JP); Taro Saito, Saitama (JP); Yukinori Nishiyama, Saitama (JP); Tomoharu Shimada, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 57 days.

(21) Appl. No.: 18/192,508

(22) Filed: Mar. 29, 2023

(65) Prior Publication Data

US 2023/0232114 A1    Jul. 20, 2023

Related U.S. Application Data

(63) Continuation of application No. PCT/JP2021/035522, filed on Sep. 28, 2021.

(30) Foreign Application Priority Data

Sep. 30, 2020    (JP) ................. 2020-165431

(51) Int. Cl.
*H04N 23/73* (2023.01)
*H04N 5/77* (2006.01)
(Continued)

(52) U.S. Cl.
CPC ............... *H04N 23/73* (2023.01); *H04N 5/77* (2013.01); *H04N 23/76* (2023.01); *H04N 23/88* (2023.01)

(58) Field of Classification Search
CPC ........ H04N 23/73; H04N 23/76; H04N 23/88; H04N 5/77
See application file for complete search history.

(56) References Cited

U.S. PATENT DOCUMENTS

2004/0136689 A1*    7/2004    Oka ............... H04N 19/172
                                                              386/352
2006/0066742 A1    3/2006    Miyata
(Continued)

FOREIGN PATENT DOCUMENTS

JP    2006-94145 A    4/2006
JP    2009-159616 A    7/2009
(Continued)

OTHER PUBLICATIONS

International Preliminary Report on Patentability and English translation of the Written Opinion of the International Searching Authority (Forms PCT/IB/326, PCT/IB/373 and PCT/ISA/237) for International Application No. PCT/JP2021/035522, dated Apr. 13, 2023.
(Continued)

*Primary Examiner* — Thai Q Tran
*Assistant Examiner* — Jose M Mesa
(74) *Attorney, Agent, or Firm* — Birch, Stewart, Kolasch & Birch, LLP

(57) ABSTRACT

Provided are an imaging device, an imaging method, and an imaging program capable of easily capturing a moving image under an imaging condition desired by a user. In one aspect of the present invention, an imaging device includes an imaging unit and a processor. The processor sets a first imaging parameter applied to moving image data captured by the imaging unit, records first moving image data captured based on the first imaging parameter on a recording device before a first operation by a user of the imaging device is received, sets a second imaging parameter applied to the moving image data in a case where the first operation is received, and records the second moving image data captured based on the second imaging parameter on the recording device in a case where a second operation by the user is received after the reception of the first operation.

20 Claims, 15 Drawing Sheets

(51) Int. Cl.
    *H04N 23/76*    (2023.01)
    *H04N 23/88*    (2023.01)

(56) References Cited

U.S. PATENT DOCUMENTS

| | | | | |
|---|---|---|---|---|
| 2008/0218611 | A1* | 9/2008 | Parulski | H04N 23/741 348/262 |
| 2009/0316009 | A1* | 12/2009 | Ito | G06T 5/70 348/208.4 |
| 2011/0193990 | A1* | 8/2011 | Pillman | H04N 23/667 348/E5.037 |
| 2013/0042178 | A1* | 2/2013 | Kachi | G06F 16/74 715/716 |
| 2016/0182815 | A1* | 6/2016 | Urabe | H04N 9/8205 348/231.6 |
| 2017/0163880 | A1* | 6/2017 | Oshima | H04N 5/2621 |

FOREIGN PATENT DOCUMENTS

| | | |
|---|---|---|
| JP | 2011-66752 A | 3/2011 |
| JP | 2016-48611 A | 4/2016 |

OTHER PUBLICATIONS

International Search Report (Form PCT/ISA/210) for International Application No. PCT/JP2021/035522, dated Dec. 14, 2021, with English translation.

\* cited by examiner

IMAGING DEVICE, IMAGING METHOD, AND IMAGING PROGRAM

CROSS-REFERENCE TO RELATED APPLICATIONS

The present application is a Continuation of PCT International Application No. PCT/JP2021/035522 filed on Sep. 28, 2021 claiming priority under 35 U.S.C § 119(a) to Japanese Patent Application No. 2020-165431 filed on Sep. 30, 2020. Each of the above applications is hereby expressly incorporated by reference, in its entirety, into the present application.

BACKGROUND OF THE INVENTION

1. Field of the Invention

The present invention relates to an imaging device, an imaging method, and an imaging program that capture a moving image.

2. Description of the Related Art

Regarding a technique for capturing a moving image, for example, JP2009-159616A describes an imaging device that displays a preview image in a selected imaging mode in a case where an imaging condition is set. Further, JP2011-066752A describes an imaging device that displays a plurality of live view images having a difference in white balance.

SUMMARY OF THE INVENTION

An embodiment according to the technique of the present disclosure provides an imaging device, an imaging method, and an imaging program capable of easily capturing a moving image under an imaging condition desired by a user.

An imaging device according to a first aspect of the present invention comprises an imaging unit and a processor. The processor sets a first imaging parameter applied to moving image data captured by the imaging unit, outputs first moving image data captured based on the first imaging parameter to a recording destination before a first operation is received, sets a second imaging parameter applied to the moving image data in a case where the first operation is received, outputs the first moving image data to the recording destination from the reception of the first operation to a reception of a second operation, and outputs second moving image data captured based on the second imaging parameter to the recording destination, instead of the first moving image data captured based on the first imaging parameter, in a case where the second operation is received.

An imaging device according to a second aspect of the present invention comprises an imaging unit, a processor, and a memory that temporarily saves moving image data output from the imaging unit. The processor sets a first imaging parameter applied to the moving image data captured by the imaging unit, outputs first moving image data captured based on the first imaging parameter to a recording destination before a first operation is received, sets a second imaging parameter applied to the moving image data in a case where the first operation is received, saves the moving image data in the memory in a period from the reception of the first operation to a reception of a second operation, and outputs second moving image data generated based on the saved moving image data to the recording destination after the second operation is received.

According to a third aspect of the present disclosure, there is provided the imaging device according to the second aspect, in which the processor outputs, to the recording destination, moving image data generated by applying the first imaging parameter to the moving image data saved in the memory as the first moving image data in a case where a remaining capacity of the memory becomes equal to or less than a threshold value before the second operation is received, and generates the second moving image data by applying the second imaging parameter to moving image data after moving image data acquired at an earliest time among the moving image data saved in the memory and outputs the generated second moving image data to the recording destination in a case where the second operation is received.

According to a fourth aspect of the present disclosure, there is provided the imaging device according to any one of the first to third aspects, in which the processor outputs the first moving image data to a display destination before the first operation is received, and outputs at least the second moving image data to the display destination after the first operation is received.

According to a fifth aspect of the present disclosure, there is provided the imaging device according to the fourth aspect, in which the processor further outputs the first moving image data to the display destination in a period from the reception of the first operation to the reception of the second operation.

According to a sixth aspect of the present disclosure, there is provided the imaging device according to the fourth or fifth aspect, in which the processor outputs only the second moving image data to the display destination after the second operation is received.

According to a seventh aspect of the present disclosure, there is provided the imaging device according to any one of the fourth to sixth aspects, in which the processor outputs a partial region of the moving image data to the display destination as the first moving image data and outputs another partial region of the moving image data to the display destination as the second moving image data in a period from the reception of the first operation to the reception of the second operation.

According to an eighth aspect of the present disclosure, there is provided the imaging device according to any one of the fifth to seventh aspects, in which the processor outputs the first moving image data to a partial region of the second moving image data in a period from the reception of the first operation to the reception of the second operation.

According to a ninth aspect of the present disclosure, there is provided the imaging device according to any one of the fifth to eighth aspects, in which the processor outputs the first moving image data and the second moving image data in parallel in a period from the reception of the first operation to the reception of the second operation.

According to a tenth aspect of the present disclosure, there is provided the imaging device according to the fifth aspect, in which the processor, in a case where the first operation is received, outputs moving image data based on a plurality of selectable imaging parameters as a list to the display destination, receives an operation of selecting one piece of moving image data from the moving image data output as a list as the second operation, and sets an imaging parameter corresponding to the selected moving image data as the second imaging parameter.

According to an eleventh aspect of the present disclosure, there is provided the imaging device according to any one of the first to tenth aspects, in which the processor changes the first imaging parameter over a plurality of times to switch the first imaging parameter to the second imaging parameter and outputs moving image data corresponding to an imaging parameter during the switching period to the recording destination as the second moving image data.

According to a twelfth aspect of the present disclosure, there is provided the imaging device according to any one of the first to eleventh aspects, in which the first imaging parameter and the second imaging parameter are imaging parameters related to white balance.

According to a thirteenth aspect of the present disclosure, there is provided the imaging device according to any one of the first to twelfth aspects, in which the first imaging parameter and the second imaging parameter are imaging parameters related to exposure, and in a case where exposure correction for darkening moving image data by the first operation is received, the processor, in a period from the reception of the first operation to the reception of the second operation, lowers sensitivity in a case where the moving image data captured by the imaging unit is taken in as compared with before the exposure correction to perform the taking-in, outputs moving image data generated by applying the second imaging parameter to the taken-in moving image data to a display destination as the second moving image data, creates moving image data having the same brightness as before the exposure correction by multiplying the taken-in moving image data by a gain, and outputs the created moving image data to the recording destination as the first moving image data.

According to a fourteenth aspect of the present disclosure, there is provided the imaging device according to the thirteenth aspect, in which the processor shortens an exposure time in a case where the moving image data is captured to darken the moving image data in a case where the lowering of the sensitivity in the case of the taking-in is not possible.

According to a fifteenth aspect of the present disclosure, there is provided the imaging device according to the fourteenth aspect, in which the processor acquires the moving image data for a plurality of frames by increasing a frame rate of the moving image data and shortening the exposure time as compared with before the exposure correction, displays moving image data generated by averaging the moving image data for the plurality of frames on the display destination as the second moving image data, and outputs moving image data generated by multiplying the generated moving image data by a gain or adding the moving image data for the plurality of frames to the generated moving image data to the recording destination as the first moving image data.

According to a sixteenth aspect of the present disclosure, there is provided the imaging device according to any one of the fifth to fifteenth aspects, in which in a case where exposure correction for brightening moving image data by the first operation is received, the processor, in a period from the reception of the first operation to the reception of the second operation, outputs moving image data generated by multiplying the moving image data captured by the imaging unit by a gain to the display destination as the second moving image data.

According to a seventeenth aspect of the present disclosure, there is provided the imaging device according to any one of the first to sixteenth aspects, in which a recording unit and/or a first connection unit connected to an external recording device are further included. The processor records the first moving image data and the second moving image data using the recording unit as the recording destination and/or records the first moving image data and the second moving image data via the first connection unit using the external recording device as the recording destination.

According to an eighteenth aspect of the present disclosure, there is provided the imaging device according to any one of the fourth to tenth and thirteenth to sixteenth aspects, in which a display unit and/or a second connection unit connected to an external display device are further included. The processor displays the first moving image data and/or the second moving image data using the display unit as the display destination and/or displays the first moving image data and/or the second moving image data via the second connection unit using the external display device as the display destination.

An imaging method according to a nineteenth aspect of the present invention is an imaging method by an imaging device including an imaging unit and a processor. The imaging method comprises, by the processor, setting a first imaging parameter applied to moving image data captured by the imaging unit, outputting first moving image data captured based on the first imaging parameter to a recording destination before a first operation is received, setting a second imaging parameter applied to the moving image data in a case where the first operation is received, outputting the first moving image data to the recording destination from the reception of the first operation to a reception of a second operation, and outputting second moving image data captured based on the second imaging parameter to the recording destination, instead of the first moving image data captured based on the first imaging parameter, in a case where the second operation is received.

An imaging program according to a twentieth aspect of the present invention is an imaging program that causes a processor of an imaging device including an imaging unit and the processor to execute each step of an imaging method. The imaging program causes the processor to execute a step of setting a first imaging parameter applied to moving image data captured by the imaging unit, a step of outputting first moving image data captured based on the first imaging parameter to a recording destination before a first operation is received, a step of setting a second imaging parameter applied to the moving image data in a case where the first operation is received, a step of outputting the first moving image data to the recording destination from the reception of the first operation to a reception of a second operation, and a step of outputting second moving image data captured based on the second imaging parameter to the recording destination, instead of the first moving image data captured based on the first imaging parameter, in a case where the second operation is received.

DESCRIPTION OF THE PREFERRED EMBODIMENTS

One embodiment of an imaging device, an imaging method, and an imaging program according to the present invention is as follows. In the description, accompanying drawings will be referred to as necessary.

First Embodiment

<Overall Configuration of Imaging Device>

Figure 1:
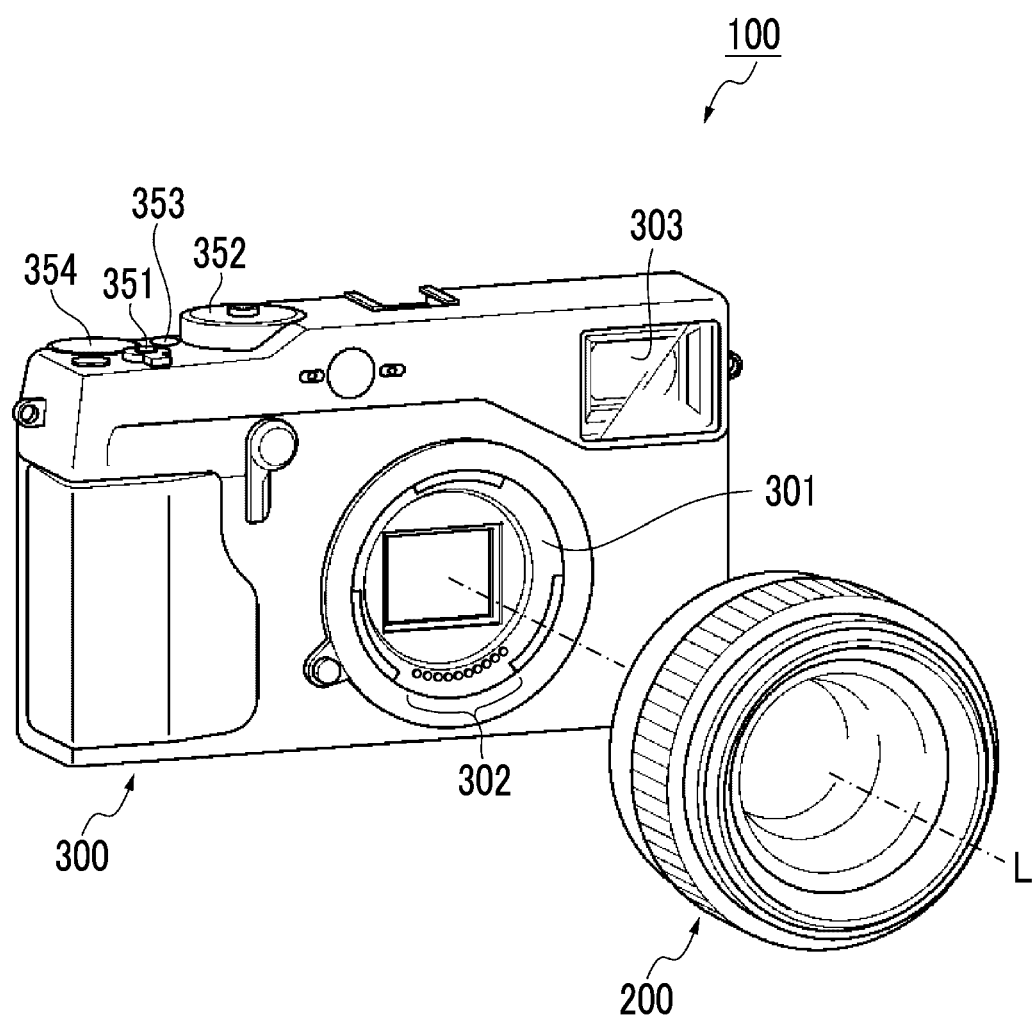
FIG. 1 is a front perspective view of an imaging device according to a first embodiment.
Figure 2:
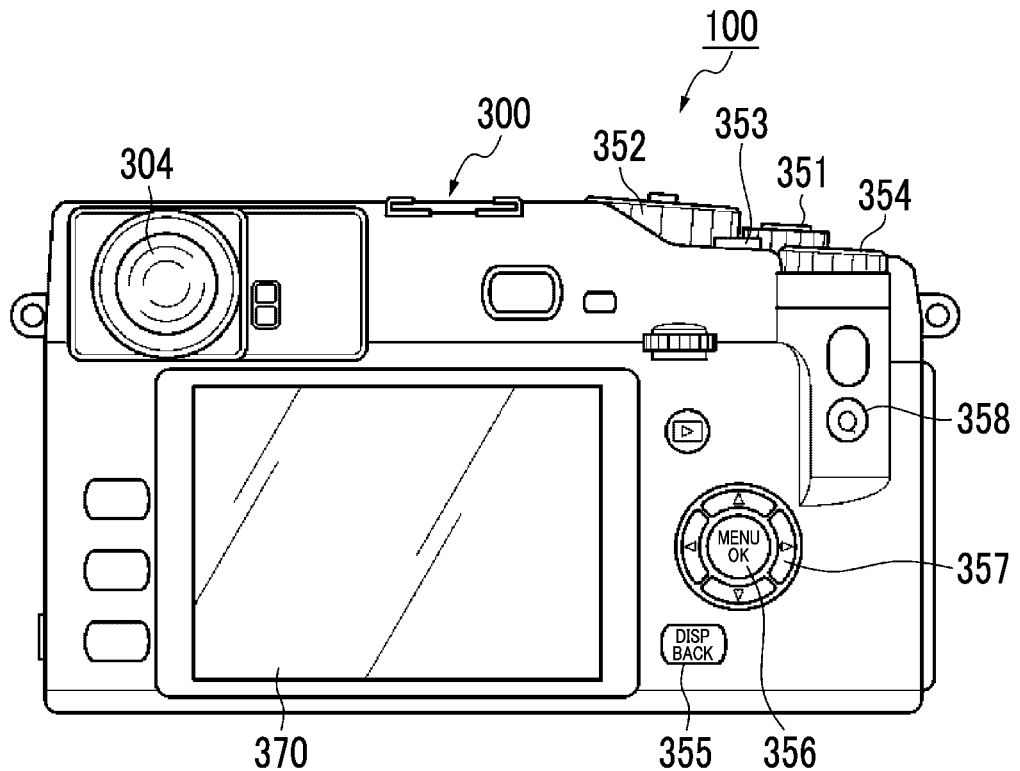
FIG. 2 is a rear view of the imaging device.
Figure 3:
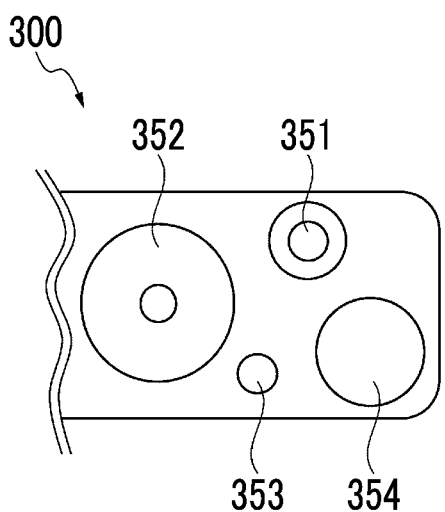
FIG. 3 is a partial top view of the imaging device.

FIG. 1 is a front perspective view of an imaging device 100 according to a first embodiment of the present invention. FIG. 2 is a rear view of the imaging device 100. FIG. 3 is a partial top view of the imaging device 100. The imaging device 100 is configured of an imaging device body 300 and an interchangeable lens 200 attached to the imaging device body 300. With coupling of a mount 301 provided on the imaging device body 300 and a mount (not shown) on the interchangeable lens 200 side corresponding to the mount 301, the imaging device body 300 and the interchangeable lens 200 are attached to each other. With releasing of the coupling, the imaging device body 300 and the interchangeable lens 200 are removed from each other. A terminal 302 is provided on the mount 301, and a terminal (not shown) is also provided on the mount on the interchangeable lens 200 side. In a case where the interchangeable lens 200 is coupled to the imaging device body 300, these terminals come into contact with each other and a communicable state is made. A front surface of the imaging device body 300 is provided with a finder window 303 and the like, in addition to the mount 301 and the terminal 302.

As shown in FIG. 2, a rear surface of the imaging device body 300 is provided with mainly a finder eyepiece portion 304, a monitor 370, a MENU/OK key 356, a cross key 357 (direction instruction button), a BACK key 355, and a Quick (Q) button 358. The MENU/OK key 356 is an operation key having both a function as a menu button for performing a command to display a menu on a screen of the monitor 370 and a function as an OK button for performing a command to confirm, execute (switch or the like white balance or exposure), and the like a selected content. The cross key 357 is an operation unit to input instructions in four directions of up, down, left, and right, and functions as a button (cursor movement operation unit) for selecting an item (for example, specific setting of white balance or exposure) from a menu screen or performing an instruction to select various setting items from each menu. Up and down keys of the cross key 357 function as a zoom switch at the time of imaging or a reproduction zoom switch at the time of a reproduction mode. Left and right keys thereof function as a frame feed (feed in forward or reverse direction) button at the time of the reproduction mode. The BACK key 355 is used for erasing a desired target such as a selected item, erasing an instruction content, or returning to one previous operation state. The Q button 358 also functions as a button for performing a command to display the menu screen on the screen of the monitor 370.

As shown in FIG. 3, an upper surface of the imaging device body 300 is provided with a release button 351, a dial 352 for setting an imaging mode or a shutter speed, a function button 353 to which a desired function is assigned, and an exposure correction dial 354. The release button 351 is a two-step stroke type button capable of performing an operation of pressing a stroke halfway (so-called operation referred to as "half-press") and an operation of pressing the stroke fully (so-called operation referred to as "full-press"). The user uses these buttons or dials provided on the upper surface and the rear surface of the imaging device body 300 to perform imaging start/end of a moving image and operations (first operation to second operation) such as selection or confirmation of imaging parameters (first imaging parameter, second imaging parameter) such as white balance or exposure, which are described below.

Figure 4:
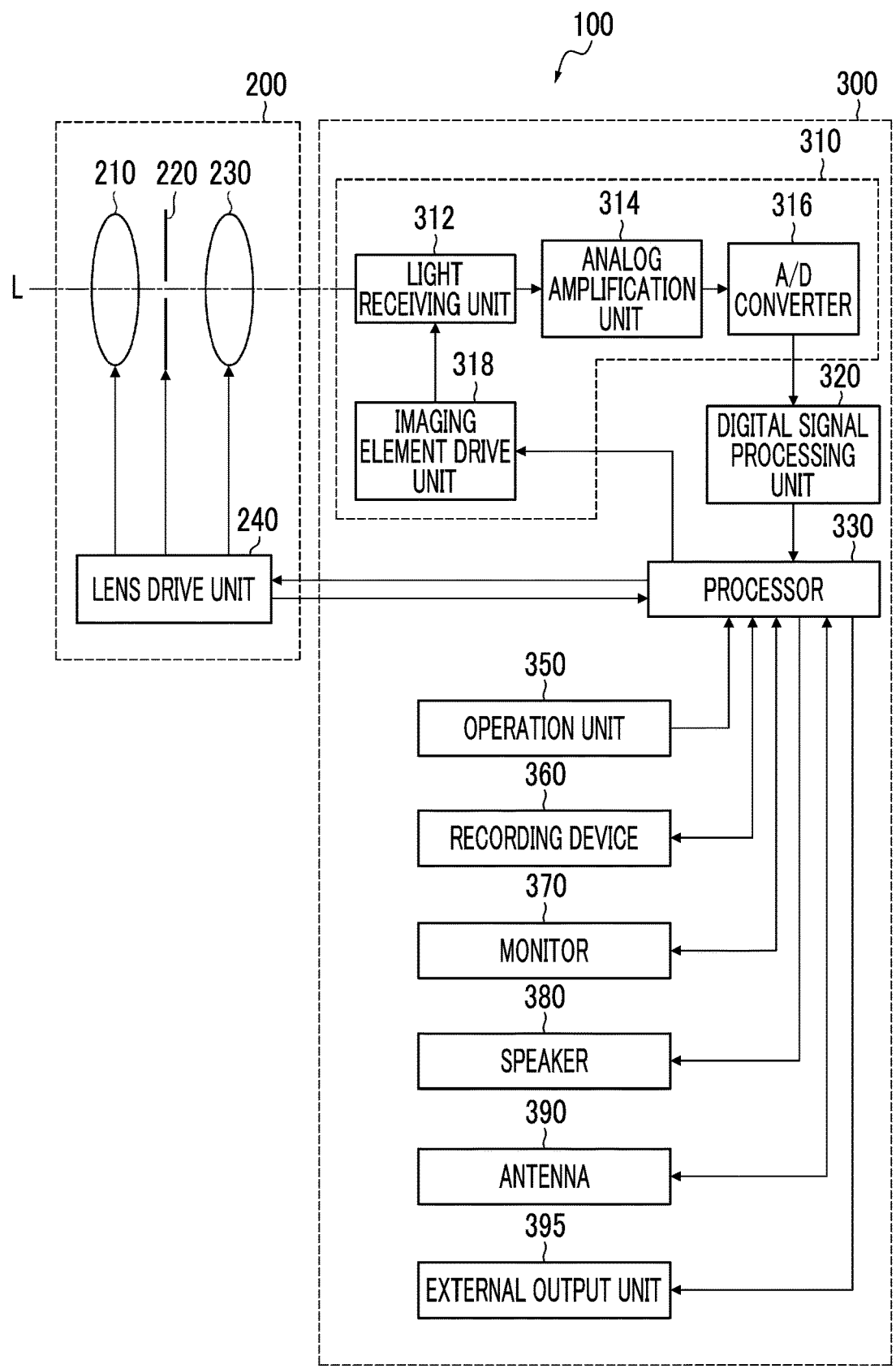
FIG. 4 is a block diagram showing a schematic configuration of the imaging device.

FIG. 4 is a block diagram showing a schematic configuration of the imaging device 100 (imaging device). The imaging device 100 is configured of the interchangeable lens 200 and the imaging device body 300, and forms a subject image (optical image) on a light receiving unit 312 of an imaging element 310 (imaging element) with an imaging lens including a zoom lens 210 and a focus lens 230 described below. Although the case where the imaging device 100 comprises the interchangeable lens 200 is described in the first embodiment, a lens device (optical system) may be fixed to a camera body.

<Configuration of Interchangeable Lens>

The interchangeable lens 200 comprises the zoom lens 210, a stop 220, the focus lens 230, and a lens drive unit 240. The lens drive unit 240 drives the zoom lens 210 and the focus lens 230 forward and backward in a direction of an optical axis L in response to a command from a processor 330 (lens drive control unit 346 in FIG. 5: processor) to perform zoom (optical zoom) adjustment and focus adjustment. The zoom adjustment and the focus adjustment may be performed in response to a zoom operation and a focus operation (moving rotationally with a zoom ring and a focus ring (not shown) or the like) performed by a user, in addition to the command from the processor 330. The lens drive unit 240 controls the stop 220 in response to the command from the processor 330 to adjust exposure. On the other hand, information such as positions of the zoom lens 210 and the focus lens 230 and an opening degree of the stop 220 is input to the processor 330.

<Configuration of Imaging Device Body>

The imaging device body 300 comprises the imaging element 310 (imaging unit), a digital signal processing unit 320, the processor 330 (processor), an operation unit 350, a recording device 360 (recording unit, recording destination), the monitor 370 (display unit, display destination), a speaker 380, an antenna 390, and an external output unit 395 (first connection unit, second connection unit). The imaging device body 300 may have a shutter (not shown) for blocking light transmitted through the imaging element 310. The shutter may be a mechanical shutter or an electronic shutter. In a case of the electronic shutter, the processor 330 controls a charge accumulation period of the imaging element 310, and thus an exposure time (shutter speed) can be adjusted.

<Configuration of Imaging Element>

The imaging element 310 comprises the light receiving unit 312, an analog amplification unit 314, an A/D converter 316, and an imaging element drive unit 318. The light receiving unit 312 comprises a light receiving surface on which a large number of light receiving elements are arranged in a matrix. Subject light transmitted through the zoom lens 210, the stop 220, and the focus lens 230 is imaged on the light receiving surface of the light receiving unit 312, and is converted into an electric signal by each light receiving element. A color filter of R (red), G (green), or B (blue) is provided on the light receiving surface of the light receiving unit 312, and a color image of a subject can be acquired based on a signal of each color. In the present embodiment, a complementary metal-oxide semiconductor (CMOS) type color image sensor can be used as the imaging element 310.

In an example of the configuration of the CMOS type image sensor, the analog amplification unit 314 is provided for each pixel or each of a plurality of pixels constituting the light receiving unit 312. A pixel signal is amplified by the analog amplification unit 314, then read out in line units, and supplied to the analog-to-digital (A/D) converter 316. The A/D converter 316 converts the supplied pixel signal into a digital pixel signal and supplies the converted signal to the digital signal processing unit 320. The digital signal processing unit 320 performs digital correlative double sampling processing, digital gain processing, correction processing, and the like to convert the digital pixel signal into a digital image signal. The imaging element drive unit 318 drives the imaging element 310 in response to the command from the processor 330 (imaging control unit 336; processor).

In a case where the imaging element 310 is the CMOS type image sensor, an imaging element drive unit, an analog amplification unit, and an A/D converter are often included in the imaging element package as shown in FIG. 4, but an image sensor having a configuration different from this aspect may be used.

A color image sensor of an XY address type, a charge-coupled device (CCD) type, or the like, in addition to the CMOS type, can be used as the imaging element 310.

<Processor Configuration>

Figure 5:
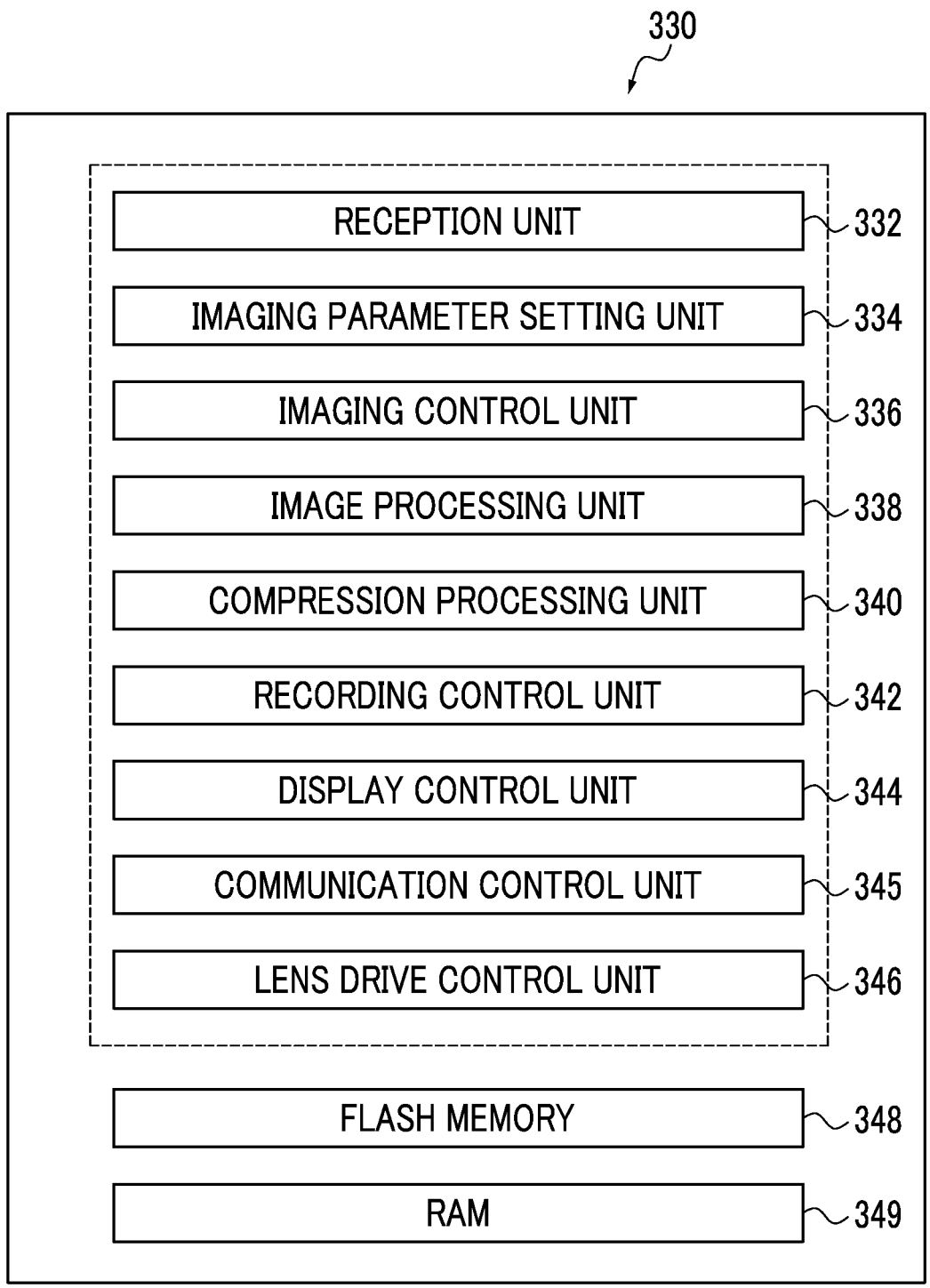
FIG. 5 is a diagram showing a functional configuration of a processor.

FIG. 5 is a diagram showing a functional configuration of the processor 330 (processor, computer). The processor 330 has functions as a reception unit 332, an imaging parameter setting unit 334, an imaging control unit 336, an image processing unit 338, a compression processing unit 340, a recording control unit 342, a display control unit 344, a communication control unit 345, and the lens drive control unit 346. The processor 330 performs processing such as capturing, image processing, compression, and recording of a moving image based on the digital image signal input from the digital signal processing unit 320. Details of the processing by the processor 330 will be described below.

The functions of the processor 330 described above can be realized by using various processors. The various processors include, for example, a central processing unit (CPU), which is a general-purpose processor that executes software (program) to realize various functions. The various processors described above include a graphics processing unit (GPU), which is a processor specialized in the image processing. The various processors described above also include a programmable logic device (PLD), which is a processor whose circuit configuration can be changed after manufacturing, such as a field programmable gate array (FPGA). Further, the various processors described above also include a dedicated electric circuit, which is a processor having a circuit configuration specifically designed to execute specific processing such as an application specific integrated circuit (ASIC).

Each function of the processor 330 may be realized by one processor or may be realized by a plurality of processors. Further, one processor may support a plurality of functions. Furthermore, each function of the processor 330 may be realized by a circuit, or a part of each function may be realized by a circuit and the rest may be realized by a processor.

In a case where the above processor or electric circuit executes software (program), a processor (computer) readable code of the software to be executed or data necessary for executing the software is stored in a non-transitory recording medium such as a flash memory and the processor refers to the software or data. The software stored in the non-transitory recording medium includes an imaging program (program for operating imaging device) for executing each step of the imaging method according to the present embodiment. The code or data may be recorded on a non-transitory recording medium using various magneto-optical recording devices, a semiconductor memory, or the like, instead of the flash memory. The term "semiconductor memory" includes a read only memory (ROM) and an electronically erasable and programmable ROM (EEPROM), in addition to the flash memory. In a case where the processing using the software is performed, for example, a random access memory (RAM) is used as a temporary storage area.

As shown in FIG. 5, the processor 330 comprises a flash memory 348 (non-transitory recording medium, memory). A code that can be read by a computer (for example, various processors constituting the processor 330) of a program (including a program (imaging program) for executing each step of the imaging method according to the present embodiment) necessary for capturing, recording, and displaying an image or data (for example, frame compression or recording pattern) necessary for executing the program is recorded in the flash memory 348. Further, the processor 330 comprises a RAM 349 (memory) as a temporary storage area and a work area. The RAM 349 can be used for buffering moving image data (described below).

<Operation Unit>

The operation unit 350 is configured of the buttons, keys, dials, and the like shown in FIGS. 2 and 3, and the user can perform various operations such as an imaging mode setting, a setting of imaging parameters (for example, white balance, exposure, shutter speed, frame rate, compression type, compression rate, and image processing such as film simulation; first imaging parameter, second imaging parameter) of the moving image, a moving image capturing instruction, and a still image capturing instruction. Further, the processor 330 can receive these user instructions. The monitor 370 (display unit) may be configured of a touch panel type device and used as an operation unit.

<Recording Device>

The recording device 360 (recording unit, recording destination) is configured of various magneto-optical recording media, a non-transitory recording medium such as a semiconductor memory, and a control circuit thereof, and can store the moving image, the still image, and the like. The recording device 360 can record first moving image data and second moving image data. As a recording medium constituting the recording device 360, a type capable of being attached to and detached from the imaging device body 300 can be used. The processor 330 (recording control unit 342, communication control unit 345, and the like) may transmit the captured image (including the first moving image data and the second moving image data) to external recording devices (external recording device, recording destination; for example, a magneto-optical recording device or a semiconductor recording device of a personal computer, a recording device on a cloud, and the like) via the antenna 390 or the external output unit 395 (first connection unit, second connection unit) for recording the captured image on these external recording devices.

<Monitor and Speaker>

The monitor 370 (display unit) is configured by, for example, a touch panel type liquid crystal display panel, and can display a screen for imaging parameter setting, a set imaging parameter, a moving image, a still image, a remaining recording time, a warning message to the user, and the like. This message may be output by voice from the speaker 380. The processor 330 (display control unit 344 and the like) may display the captured image (including the first moving image data and/or the second moving image data) on an external display device (external display device, display destination) connected via the external output unit 395 (first connection unit, second connection unit).

<Switching of Imaging Parameter of Moving Image and Method of Present Invention>

In a case where light intensity (type of light source, brightness, or the like) changes during capturing of the moving image, the user may want to change the imaging parameter related to white balance, exposure, or the like. In such a situation, in a case where the exposure or white balance setting is switched during recording of the moving image and the switching is immediately reflected in the moving image being recorded, a wrong moving image is recorded in a case where the user switches to a wrong (inappropriate) exposure or white balance, and thus the imaging is requested to be performed again or the imaging opportunity is missed.

In view of such circumstances, the inventors of the present application perform intensive studies and obtain the idea of "a result of switching the imaging parameter (exposure, white balance, or the like) is reflected only in a live view image without being reflected in the moving image being recorded during recording of the moving image, the user checks the reflection result in the live view image and issues an instruction to execute the reflection, and then the switching result is reflected in the moving image being recorded". Accordingly, a possibility of capturing a moving image having a wrong imaging parameter, such as exposure and white balance, can be reduced, and the user can easily capture a moving image under a desired imaging condition. Hereinafter, specific aspects of this method will be described.

<Processing of imaging Method (Example 1)>

Figure 6:
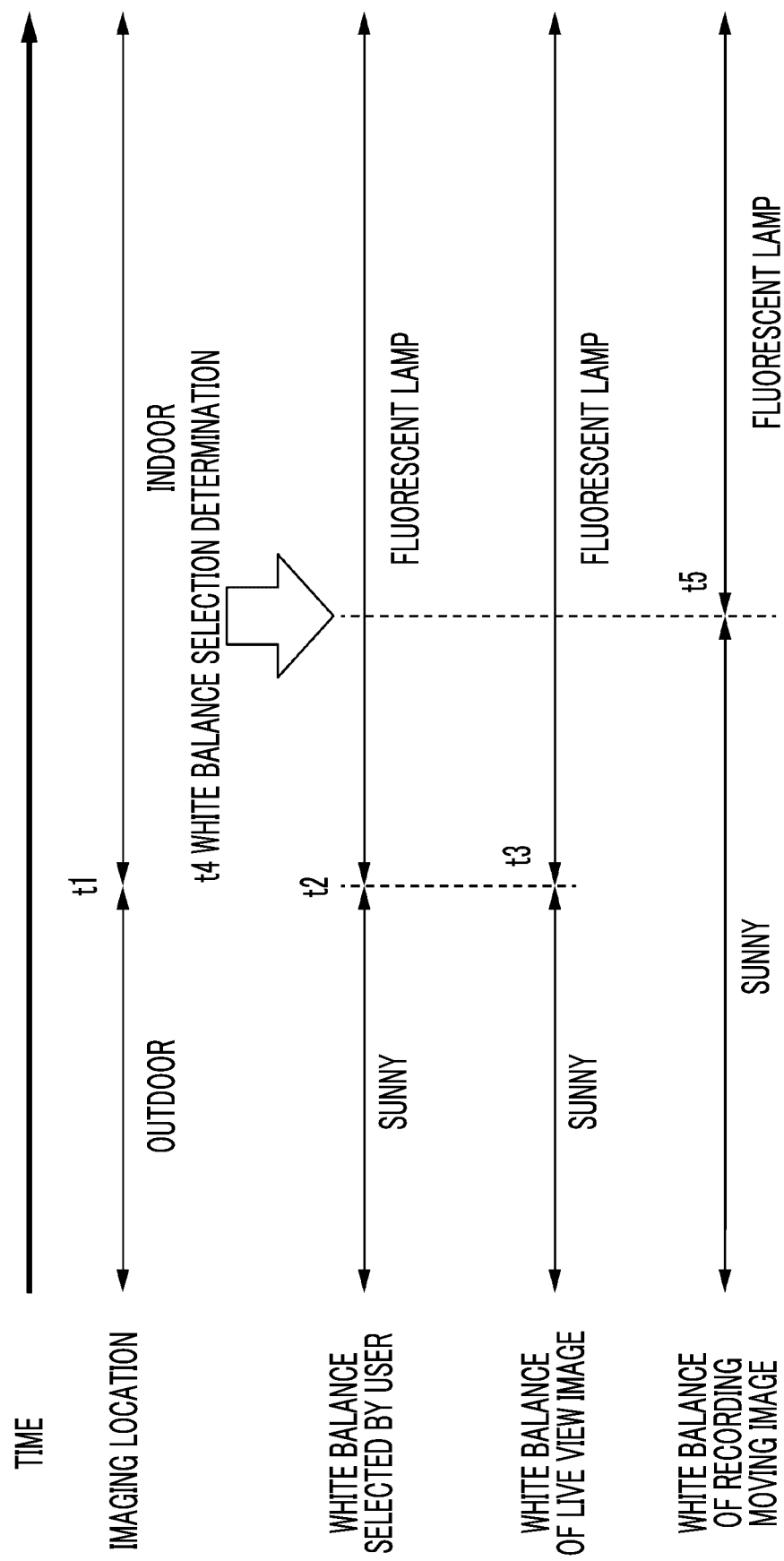
FIG. 6 is a diagram showing a state where white balance is switched and a moving image is recorded.

FIG. 6 is a diagram showing a state where the white balance is switched and a moving image is recorded. The imaging parameter setting unit 334 (processor) is assumed to set "sunny" as the first imaging parameter (here, "light source" which is imaging parameter related to white balance) applied to the moving image data captured by the imaging unit (imaging element 310 or the like).

<Capturing, Recording, and Displaying of First Moving Image>

Figure 7A:
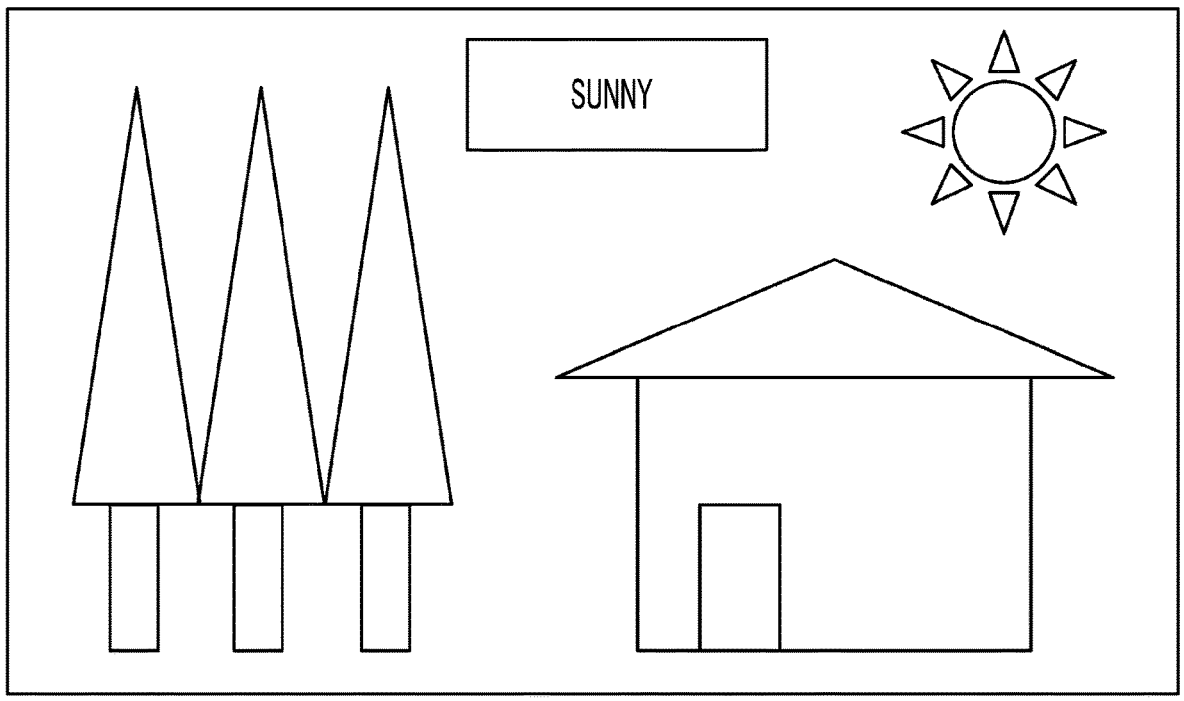
FIGS. 7A and 7B are diagrams showing a state where white balance is switched and a live view image is displayed.
Figure 7B:
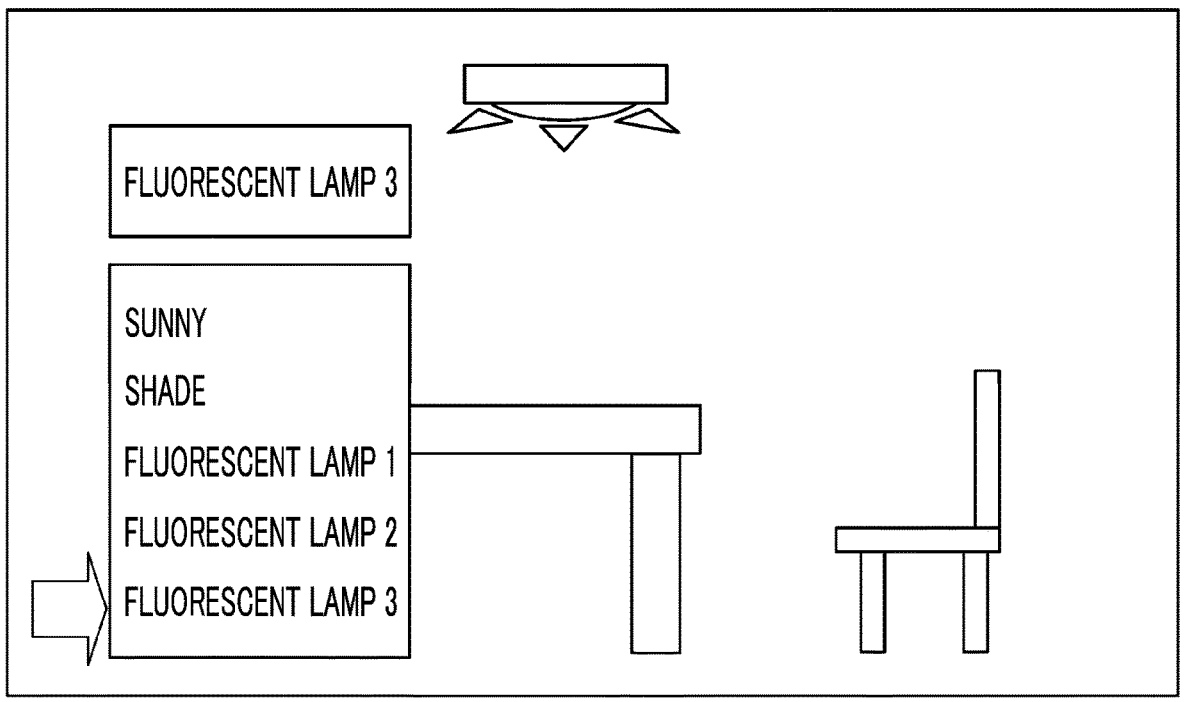

The processor 330 (the reception unit 332, the imaging control unit 336, the image processing unit 338, the compression processing unit 340, the recording control unit 342, and the like) starts the imaging of the moving image data based on the first imaging parameter, the image processing, the compression, and the recording to the recording device 360 (recording unit, recording destination) in response to an operation of the release button 351 or the like. Further, the display control unit 344 (processor) displays the live view image on the monitor 370 (display unit, display destination). Until a time point t1, the first moving image data is displayed as the live view image. FIGS. 7A and 7B are diagrams showing a state where the white balance is switched and the live view image is displayed. FIG. 7A is an example of the live view image in a case where the white balance is "sunny".

The live view image is an image displayed on a display device without recording the image captured by the imaging unit on a recording medium or the like such that a photographer can check an angle of view, the subject, and the like before capturing and recording of the image are performed. The processor 330 can repeat the generation and recording of an I frame, a P frame, and a B frame in a predetermined pattern according to the setting of the image quality and the compression rate.

<Setting of Second Imaging Parameter (First Operation)>

In the example of FIG. 6, an imaging location is a sunny outdoor area until the time point t1, and the user moves from the outdoor area to an indoor area at time point t1. The user switches the selection of the white balance (light source) from "sunny" to "fluorescent lamp" at a time point t2 as the imaging location moves (operations of operation unit 350, function button 353, MENU/OK key 356, cross key 357, and the like: first operation). In a case where the reception unit 332 receives the first operation, the imaging parameter setting unit 334 (processor) sets the second imaging parameter applied to the moving image data. The time point t2 does not have to be exactly the same time as the time point t1.

<Capturing, Displaying, and Recording after First Operation>

The image processing unit 338 and the display control unit 344 (processor) generate the live view image (second moving image data) based on the set second imaging parameter (in this case, the light source is the "fluorescent lamp") from a time point t3 (after time point t2) and display the live view image on the monitor 370 (display device) as illustrated in FIG. 7B. As shown in FIG. 7B, which white balance (light source) is selected may be displayed by a character, a symbol, a figure, or the like. Further, the live view image may be displayed on an external display device via the external output unit 395 (the same applies to the following examples). With such a display, the user can check the moving image (second moving image data) in the white balance after the switching and can easily determine whether or not the switching is appropriate.

On the other hand, the processor 330 (the image processing unit 338, the compression processing unit 340, the recording control unit 342, and the like; processor) continues to record the moving image (first moving image data) in the white balance before the switching (in this case, "sunny") in a period to a time point t4 (reception of second operation) described below after the time point t3. Accordingly, recording of an inappropriate moving image can be prevented in a case where the switching of the imaging parameter ("light source" which is imaging parameter related to white balance) is not appropriate.

<Capturing, Displaying, and Recording after Second Operation>

After checking that the white balance after the switching is appropriate, the user operates the operation unit 350 (function button 353, MENU/OK key 356, cross key 357, Q button 358, and the like; refer to FIGS. 1 to 4) to perform an operation for determining the selection of the white balance (second operation). An operation for performing an instruction to switch the imaging parameter (first operation) and the operation for determining the switching (second operation) may be performed on a member different from each other. The second operation is assumed to be performed at the time point t4 (after receiving the first operation described above).

In a case where the second operation is received, the processor 330 (reception unit 332, imaging control unit 336, image processing unit 338, compression processing unit 340, recording control unit 342, and the like) causes the recording device 360 (recording destination) to record the moving image (second moving image data) captured based on the white balance after the switching (in this case, the light source is the "fluorescent lamp"), instead of the moving image (first moving image data) captured based on the white balance before the switching, after a time point t5. Since the moving image recorded here is a moving image whose white balance is checked to be appropriate, there is no problem in recording the moving image. Further, after receiving the second operation, the processor 330 (display control unit 344 and the like) displays the moving image captured based on the white balance after the switching (second moving image data) on the monitor 370.

As described above, according to Example 1, the user can easily capture a moving image under a desired imaging condition.

<Recording Format of Moving Image>

In a case where the moving image (first moving image data, second moving image data) is recorded, it is preferable to be able to grasp the moving image before or after the switching of the imaging parameter. For example, the processor 330 (image processing unit 338, compression processing unit 340, recording control unit 342, and the like) can continuously record the first moving image data and the second moving image data in a single file. In a case where the first moving image data and the second moving image data are recorded in separate files, processing such as including white balance names (types of light source) in file names (for example, "20200901-0001_shine.mov" and "20200901-0001_fluorescent1.mov"), assigning identification numbers ("20200901-0001_01.mov" and "20200901-0001_02.mov"), or recording moving image files before and after the switching in the same folder can be performed.

<Processing of Imaging Method (Example 2)>

Figure 8:
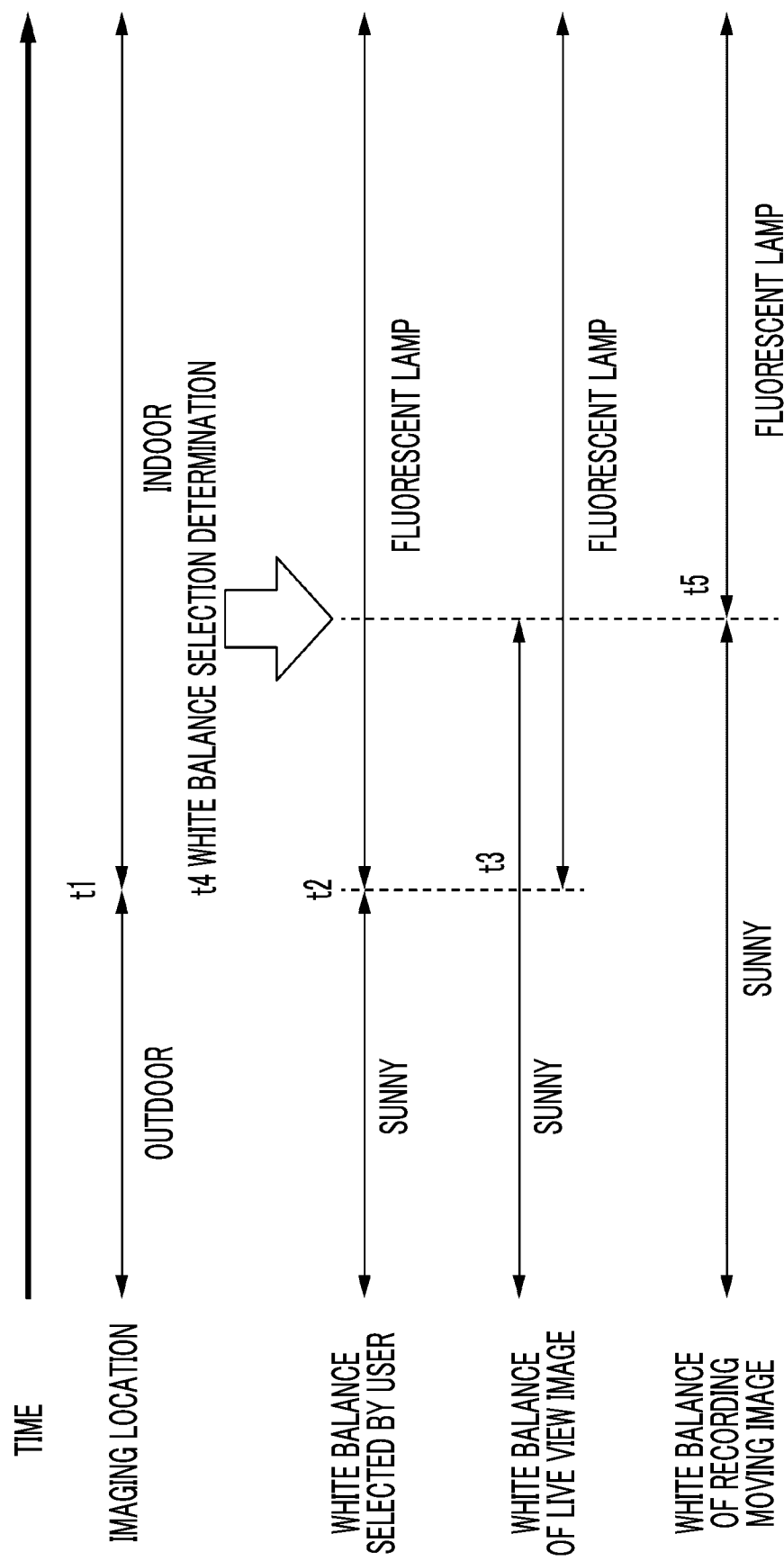
FIG. 8 is another diagram showing the state where the white balance is switched and the moving image is recorded.

In Example 1 described above, only the moving image (second moving image data) based on the white balance after the selection determination is displayed from the selection operation (first operation) to the determination operation (second operation). However, as shown in FIG. 8 (another diagram showing state where the white balance is switched and the moving image is recorded), the moving image based on the white balance before the switching (first moving image data) may be displayed on the monitor 370 and/or an external display device during this period (time point t3 to time point t4). Accordingly, since the user can simultaneously visually recognize the moving images based on the white balance before and after the switching, whether or not the switching is appropriate can be easily checked, and a possibility of a selection error can be reduced. An example of such a display will be described below.

<Display Example in Example 2 (Part 1)>

Figure 9:
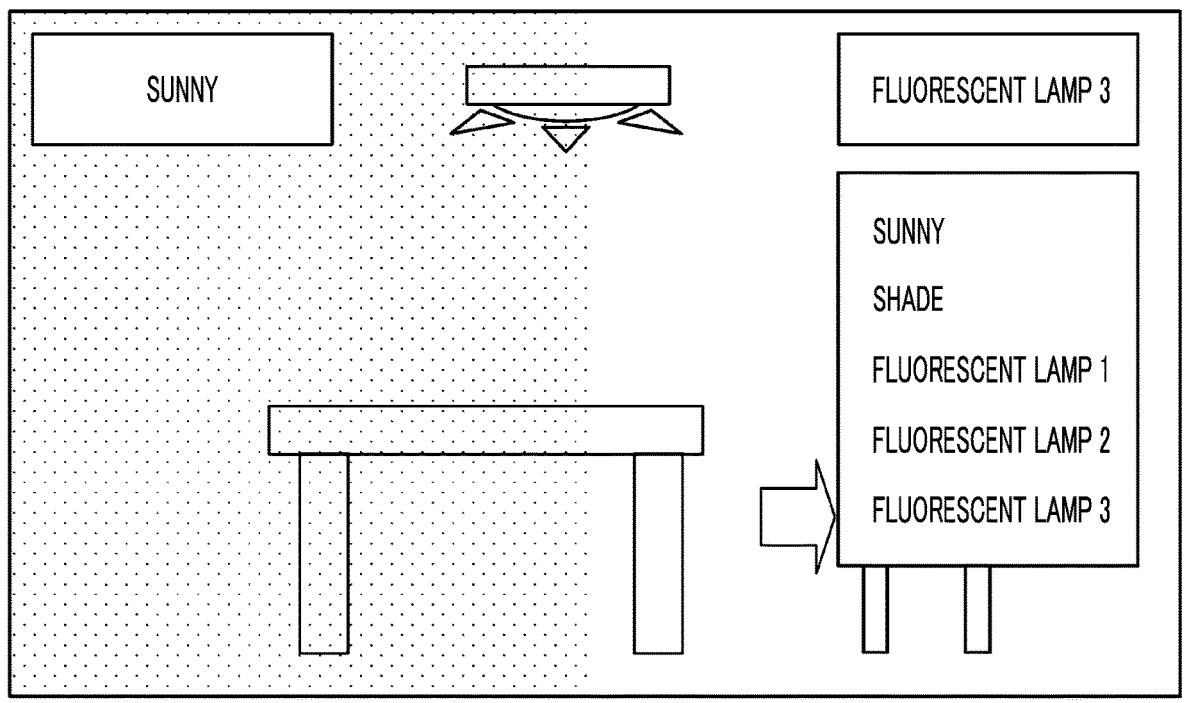
FIG. 9 is a diagram showing an example of displaying a live view image in Example 2.

FIG. 9 is a diagram showing an example of displaying the live view image in Example 2. In the example shown in FIG. 9, in a period from the reception of the first operation to the reception of the second operation, the processor 330 (display control unit 344 and the like) causes the monitor 370 to display a partial region (left half of monitor 370) of single moving image data as the moving image (first moving image data) based on the white balance (light source) before the switching and causes the monitor 370 to display another partial region (right half of monitor 370) of the moving image data as the moving image (second moving image data) based on the white balance (light source) after the switching. Accordingly, the user can simultaneously visually recognize the moving image based on the white balance before and after the switching. As described above, the processor 330 (display control unit 344 and the like) preferably identifies and displays which region is the moving image corresponding to which white balance by a character, a figure, a symbol, or the like (the same applies to other display examples).

<Display Example in Example 2 (Part 2)>

Figure 10:
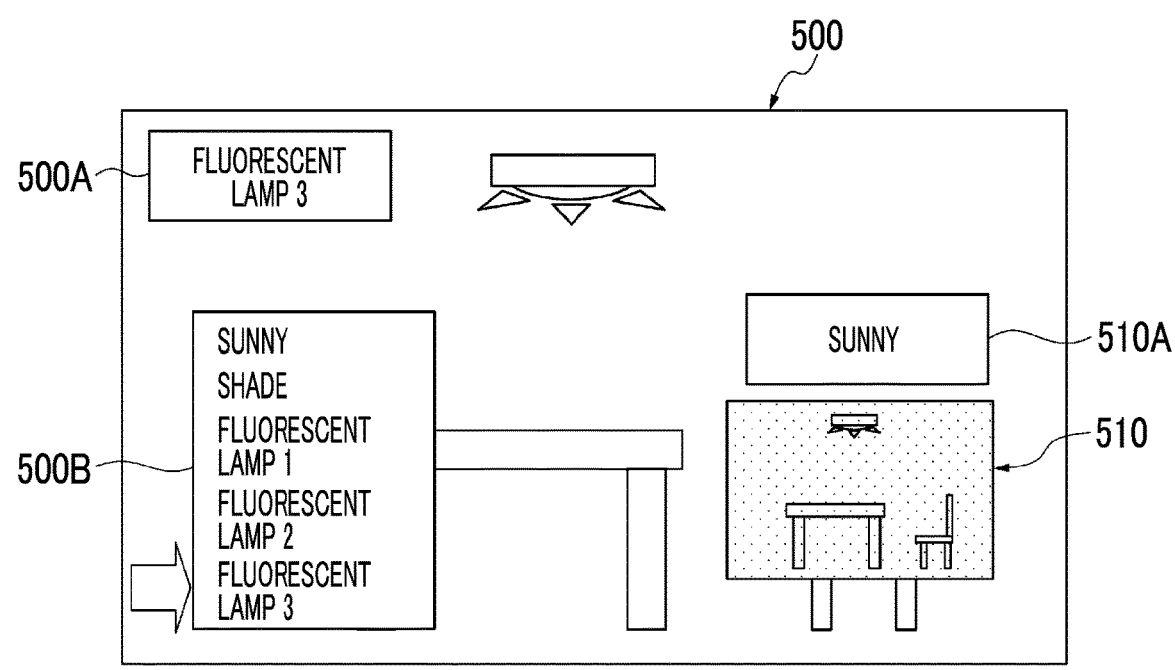
FIG. 10 is a diagram showing another example of displaying the live view image in Example 2.

FIG. 10 is a diagram showing another example of displaying the live view image in Example 2. In the example shown in FIG. 10, in the period from the reception of the first operation to the reception of the second operation, the processor 330 (display control unit 344 and the like) simultaneously displays a moving image 510 (first moving image data) based on the white balance before the switching in a partial region of a moving image 500 (second moving image data) based on the white balance after the switching (Picture in Picture method). Even with such a display, the user can simultaneously visually recognize the moving image based on the white balance (light source) before and after the switching, and the possibility of the selection error can be reduced. The processor 330 (display control unit 344 and the like) displays in regions 500A and 500B that the white balance of the moving image 500 is "fluorescent lamp (fluorescent lamp 3)" by a character and a symbol, and also displays in a region 510A that the white balance of the moving image 510 is "sunny" by a character.

<Display Example in Example 2 (Part 3)>

Figure 11:
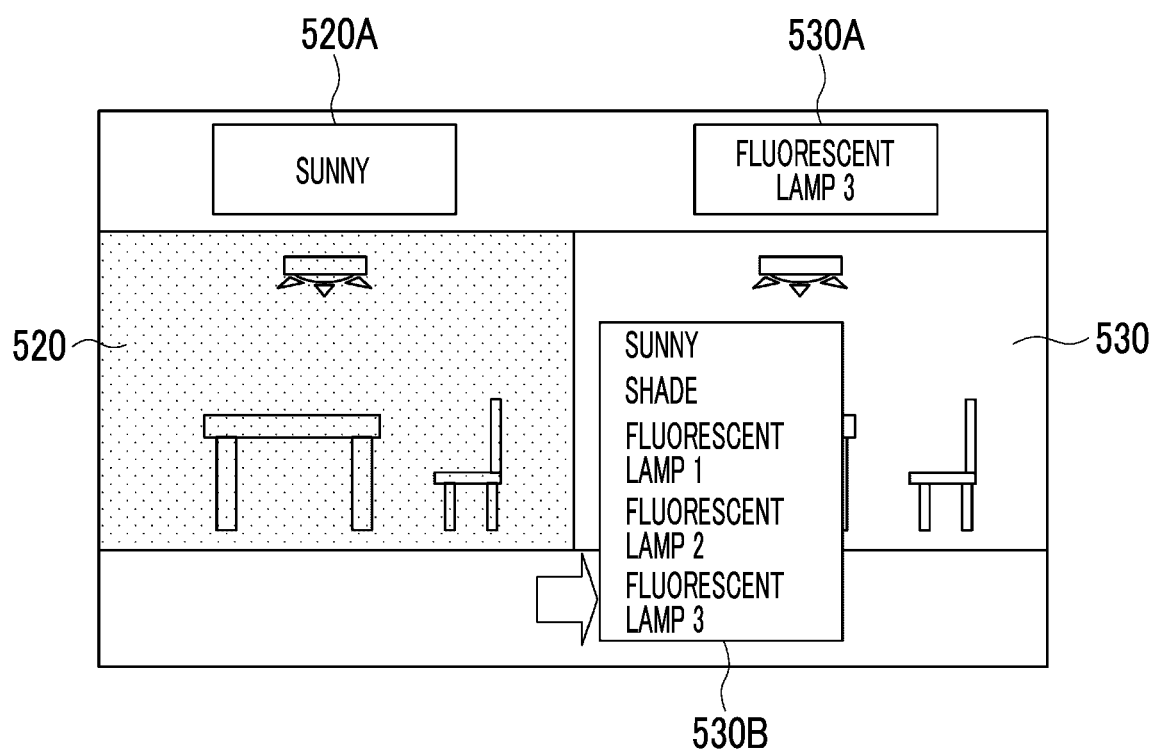
FIG. 11 is a diagram showing still another example of displaying the live view image in Example 2.

FIG. 11 is a diagram showing still another example of the display of the live view image in Example 2. In the example shown in FIG. 11, in the period from the reception of the first operation to the reception of the second operation, the processor 330 (display control unit 344 and the like) simultaneously displays in parallel the moving image (first moving image data) based on the white balance before the switching and the moving image (second moving image data) based on the white balance after the switching (Picture by Picture method). The processor 330 (display control unit 344 and the like) displays in a region 520A that the white balance of the moving image 520 is "sunny" by a character and displays in regions 530A and 530B that the white balance of the moving image 530 is "fluorescent lamp (fluorescent lamp 3)" by a character and a symbol, as in the case of FIG. 10.

Even with such a display, the user can simultaneously visually recognize the moving image based on the white balance before and after the switching, and the possibility of the selection error can be reduced.

<Processing of Imaging Method (Example 3)>

Figure 12:
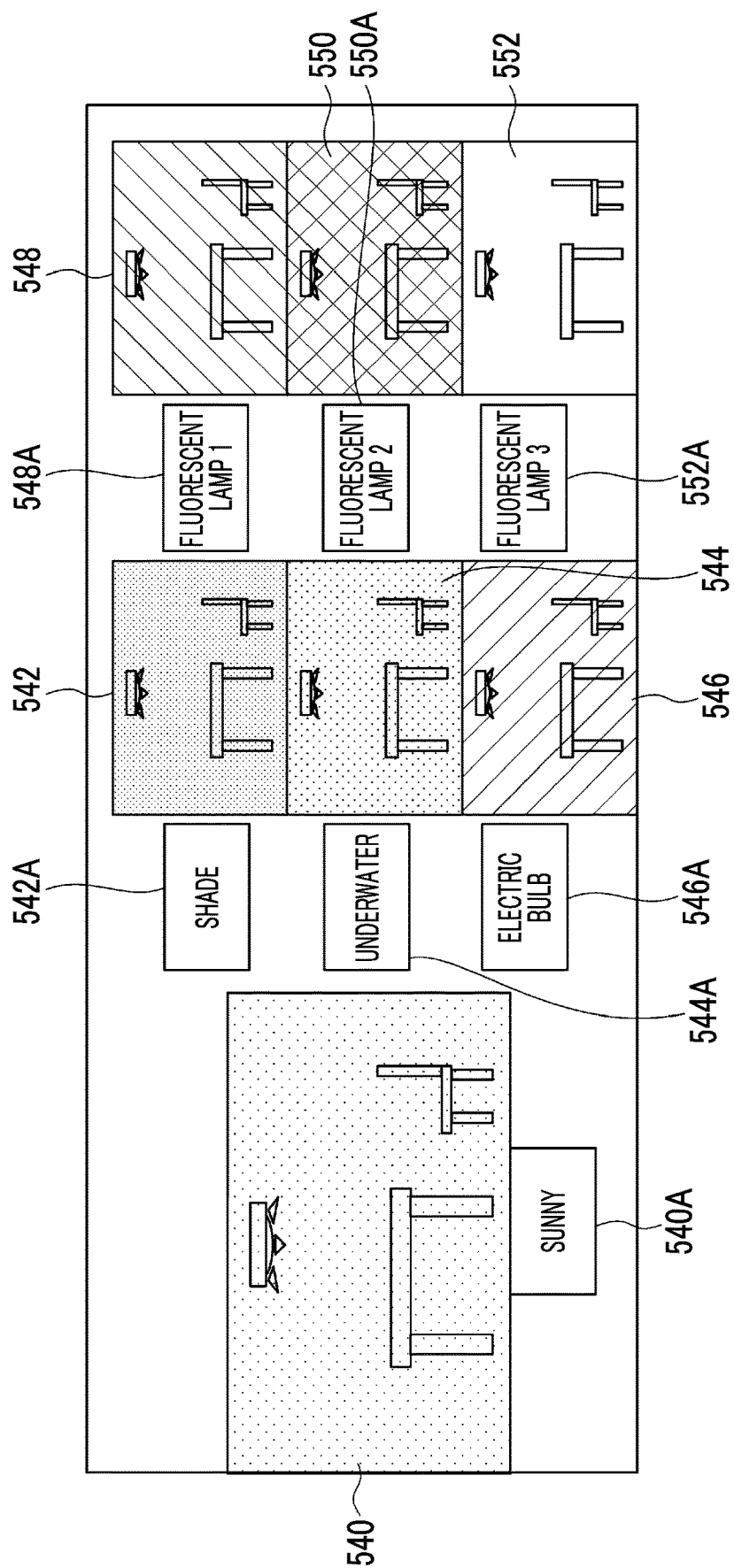
FIG. 12 is a diagram showing an example of displaying a live view image in Example 3.

FIG. 12 is a diagram showing an example of displaying the live view image in Example 3. In the example shown in FIG. 12, the processor 330 (reception unit 332, display control unit 344, and the like) causes the monitor 370 (or an external display device) to output in a list (list display) moving images 542 to 552 based on the white balance (light source) that can be selected in accordance with the first operation together with a moving image 540 based on current white balance (light source: sunny) (before switching). Further, the processor 330 (display control unit 344 or the like) displays the white balance of each moving image in regions 540A to 552A by characters. The user can perform a list output operation at time point t2 (refer to FIGS. 6 and 8). In the list output state, the processor 330 (recording control unit 342 and the like) continues to record the moving image (first moving image data) based on the white balance before the switching.

In a case where the user performs the operation (second operation) of selecting any one of the moving images (time point t4; refer to FIGS. 6 and 8), the processor 330 (reception unit 332, imaging parameter setting unit 334, and the like) sets the white balance (light source) corresponding to the moving image for which the selection is determined as the second imaging parameter and outputs the moving image (second moving image data) based on the white balance after the selection is determined, instead of the moving image (first moving image data) based on the white balance before the switching, to the recording destination (recording device 360).

Even with such a display, the user can simultaneously visually recognize the moving image based on the white balance before and after the switching, and the possibility of the selection error can be reduced. In Example 3, the monitor 370 may be configured as a touch panel type device such that a moving image can be directly selected by an operation on the touch panel. With such direct selection, a possibility of erroneous selection due to an operation error can be reduced.

<Buffering of Moving Image>

In the above Examples, the moving image (first moving image data) based on an original imaging parameter (first imaging parameter) is recorded until the user determines the selection of a new imaging parameter (second imaging parameter). However, in the present invention, with buffering of the moving image, the moving image of the new imaging parameter can be recorded retroactively to a timing at which the user starts the selection.

Figure 13:
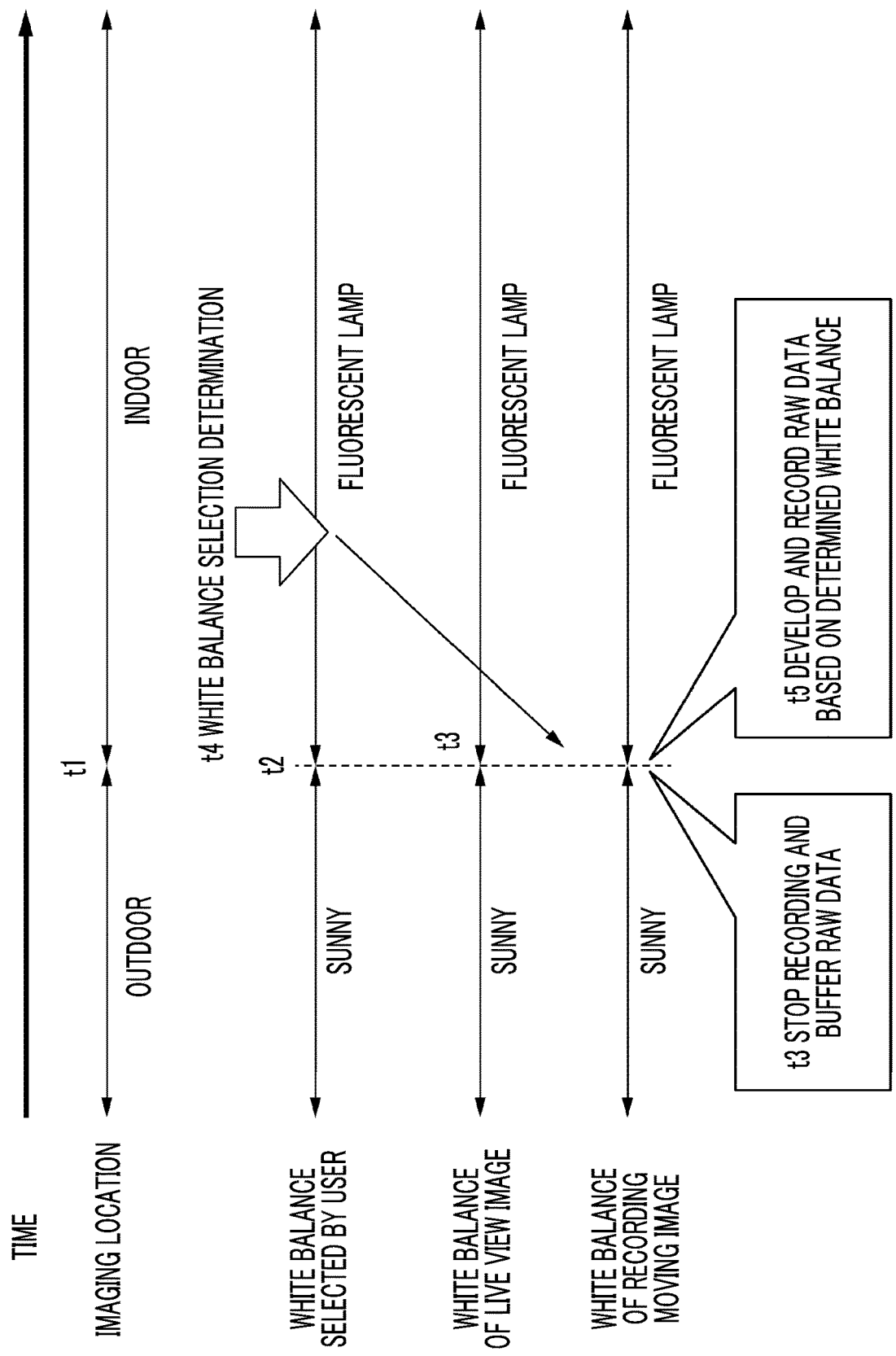
FIG. 13 is a diagram showing an example of buffering of a moving image.

FIG. 13 is a diagram showing an example of the buffering of a moving image. After the user performs the white balance (light source) selection operation (first operation) at the time point t2, the processor 330 stops recording the moving image in the recording device 360 and temporarily saves (buffers) RAW data (moving image data) output from the imaging element 310 (imaging unit) in the RAM 349 (memory). This temporary saving is performed in a period from the reception of the first operation to the reception of the second operation by the processor 330 (reception unit 332 and the like). After receiving the second operation (time point t4) for determining the selection of the white balance (time point t5 in FIG. 13), the processor 330 develops the RAW data based on the determined white balance to generate the second moving image data and records the generated second moving image data in the recording device 360. Accordingly, a moving image (second moving image data) reflecting the new white balance can be recorded retroactively to the timing at which the user starts the selection.

The processor 330 preferably executes the development of the RAW data at a speed of real time or higher (frame rate of the moving image or higher) and gradually reduces an amount of the RAW data saved in the memory.

Figure 14:
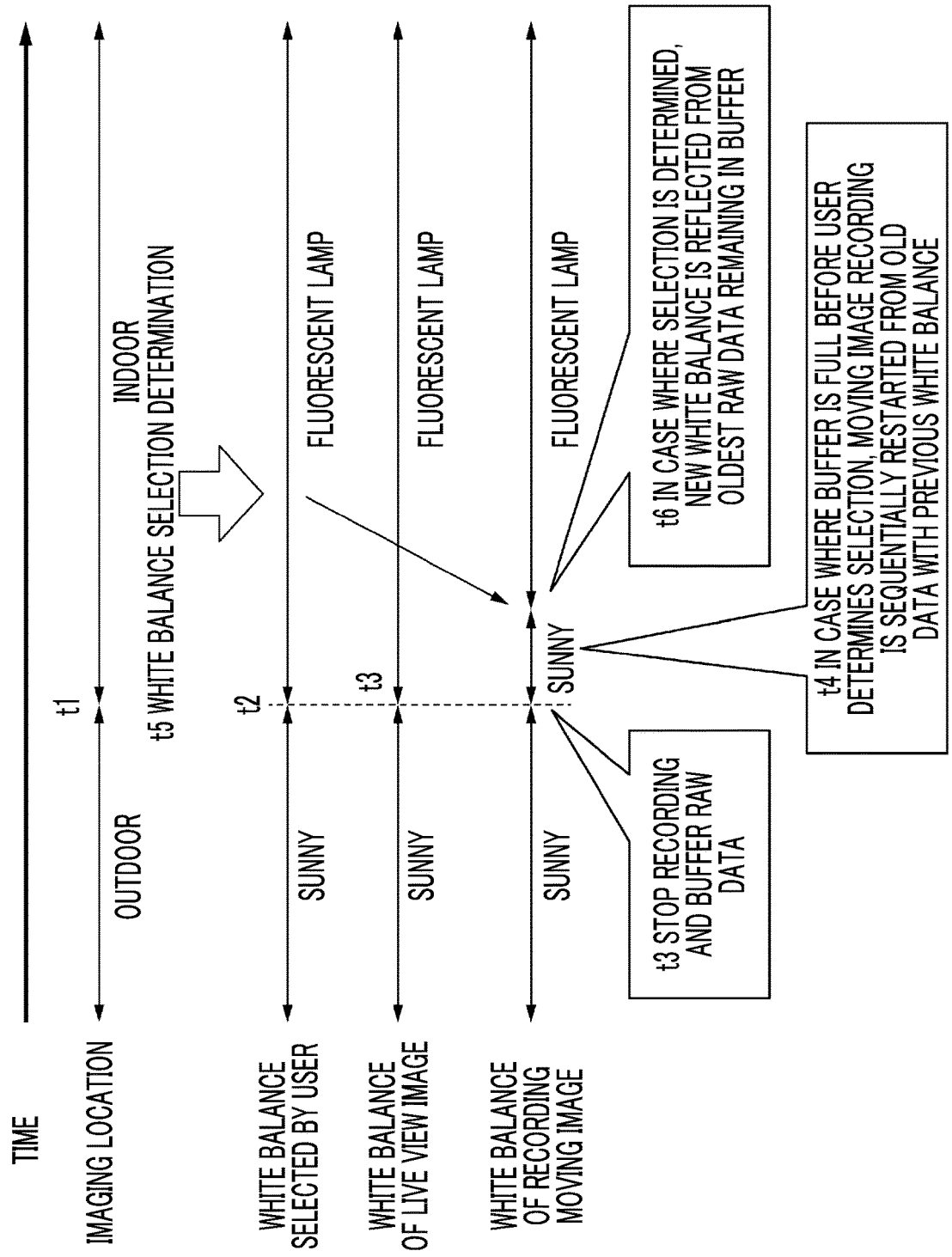
FIG. 14 is a diagram showing another example of buffering of the moving image.

FIG. 14 is a diagram showing another example of the buffering of a moving image. With the processing described above regarding FIG. 13, the moving image reflecting the new white balance can be recorded retroactively to the timing at which the user starts the selection. However, depending on a capacity of the memory, all the RAW data from the selection start (time point t2) up to the selection determination (time point t4) may not be saved. In the aspect shown in FIG. 14, in a case where a remaining capacity of the memory becomes equal to or less than a threshold value before the user determines the selection of the white balance (that is, before the processor 330 receives the second operation), the RAW data is sequentially developed from old data with the white balance (first imaging parameter) before the selection start, the recording of the moving image (first moving image data) is restarted, and new RAW data is overwritten in a free space of the memory that is no longer needed due to the development (First In First Out processing). In a case where the user determines the selection of the white balance (that is, the processor 330 receives the second operation), the processor 330 applies the determined white balance to data after the moving image data acquired at the earliest time among the RAW data (moving image data) saved in the memory (the second moving image data is generated and recorded in the recording device 360). Accordingly, a moving image reflecting the white balance after the determination can be recorded retroactively to an amount of time according to the capacity of the memory. In this case, the processor 330 preferably notifies the user of "time until the remaining capacity of the memory becomes equal to or less than the threshold value" by the monitor 370, the speaker 380, or the like.

<Gradual Change of White Balance>

In the aspect described above, in a case where the white balance after the selection determination is reflected in the moving image for recording, original white balance (light source; first imaging parameter) may be changed over a plurality of times, instead of being suddenly switched (at once) before and after the determination, to be switched to the new white balance (light source; second imaging parameter) and may record the moving image data corresponding to the white balance imaging parameter during the switching period in the recording device 360 as the second moving image data. For example, in a case where color temperatures of "sunny" and "shade" are respectively set to 5500K and 7500K, the processor 330 may reflect the color temperature in the moving image for recording such that the color temperature is gradually changed such as 5500K, 6000K, 6500K, 7000K, and 7500K, instead of suddenly switching from 5500K to 7500K before and after the selection determination. In this case, a change amount per one time may be switched according to a final change amount of the white balance. Further, the processor 330 may set the change amount such that the white balance is switched at a designated time (for example, 1 second). In this manner, with the gradual change of the white balance, a sense of discomfort (sudden change) in appearance as a moving image can be reduced.

<Change in Setting of Exposure>

In the above aspects, the selection and determination of the light source which is the imaging parameter related to the white balance have been described. However, the present invention can be similarly applied to the imaging parameter related to the exposure such as an exposure value (EV). That is, the exposure after the change is reflected only in the live view image until the selection is determined. A specific method of exposure correction will be described below.

<Case of Exposure Correction that Darkens Moving Image>

In a case where the exposure correction for darkening the moving image data by the first operation is received, the processor 330 lowers sensitivity in a case where the RAW data (moving image data) captured by the imaging unit is taken in as compared with before the exposure correction to perform the taking-in in the period from the reception of the selection operation (first operation) to the reception of the determination operation (second operation). For the live view image, the processor 330 causes the display device to display the moving image data generated by applying the exposure after the correction (second imaging parameter) to the taken-in RAW data as the second moving image data. On the other hand, for the moving image for recording, the processor 330 creates the moving image data having the same brightness as before the exposure correction by multiplying the taken-in RAW data by a gain, and causes a recording device to record the created moving image data as the first moving image data. In a case where the sensitivity in the case of the taking-in cannot be lowered, the processor 330 can darken the moving image data by shortening the exposure time in a case where the moving image data is captured.

In a case where the exposure time is shortened, a blur amount of the moving image changes, which may be different from the intention of the user. The processor 330 can acquire the moving image data for a plurality of frames by increasing the frame rate of the moving image data and shortening the exposure time as compared with before the exposure correction and cause a display device to display the moving image data generated by averaging the moving image data for the plurality of frames as the second moving image data. On the other hand, the processor 330 can cause a recording device to record the moving image data generated by multiplying the generated moving image data by a gain or by adding the moving image data for the plurality of frames to the generated moving image data as the first moving image data.

Specifically, for example, in a case where underexposure by one step is desired to perform during exposure at "60 fps, 1/60 s" (case of exposure correction for darkening moving image by one step with EV value), the RAW data is taken in at "120 fps, 1/120 s" and two images before and after the obtained RAW data are averaged to realize exposure for live view image (underexposure by one step) equivalent to 1/120 s with a blur amount equivalent to 1/60 s. Accordingly, effective sensitivity can be lowered while maintaining the exposure time.

<Case of Exposure Correction that Brightens Moving Image>

On the other hand, in a case where the exposure correction for brightening the moving image data by the first operation is received, the processor can cause a display device to display the moving image data generated by multiplying the moving image data captured by the imaging unit by a gain as the second moving image data in the period from the reception of the first operation to the reception of the second operation.

In this manner, even though the user selects an unintended exposure correction, the exposure correction is not immediately reflected in the moving image for recording, and thus recapturing of the moving image can be prevented, which enables the user to easily capture a moving image under a desired imaging condition.

<Modification Example of Operation and Instruction for Imaging Device>

Figure 15:
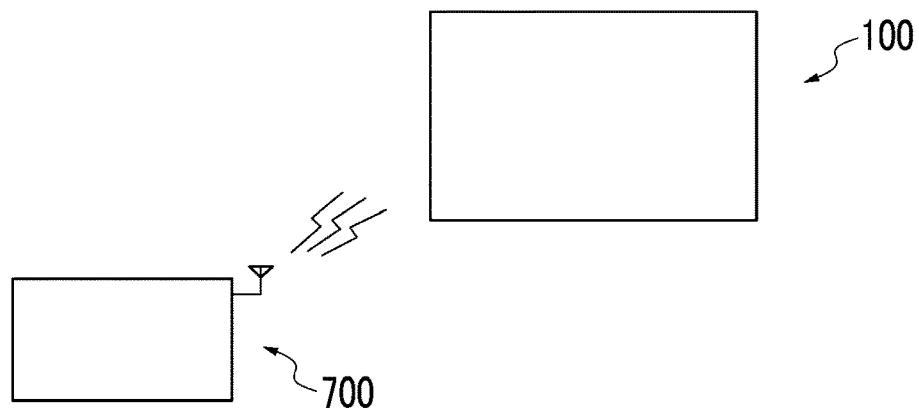
FIG. 15 is a diagram showing a state where the imaging device is controlled by using a remote controller.

In embodiment 1, the user directly performs the setting of the imaging parameter or the imaging instruction to the imaging device 100. However, the operation or the instruction to the imaging device 100 may be performed by using a remote controller. FIG. 15 is a diagram showing a state where the imaging device 100 is controlled by using a remote controller 700 (imaging instruction device), and FIG. 16 is a diagram showing a configuration of the remote controller 700.

Figure 16:
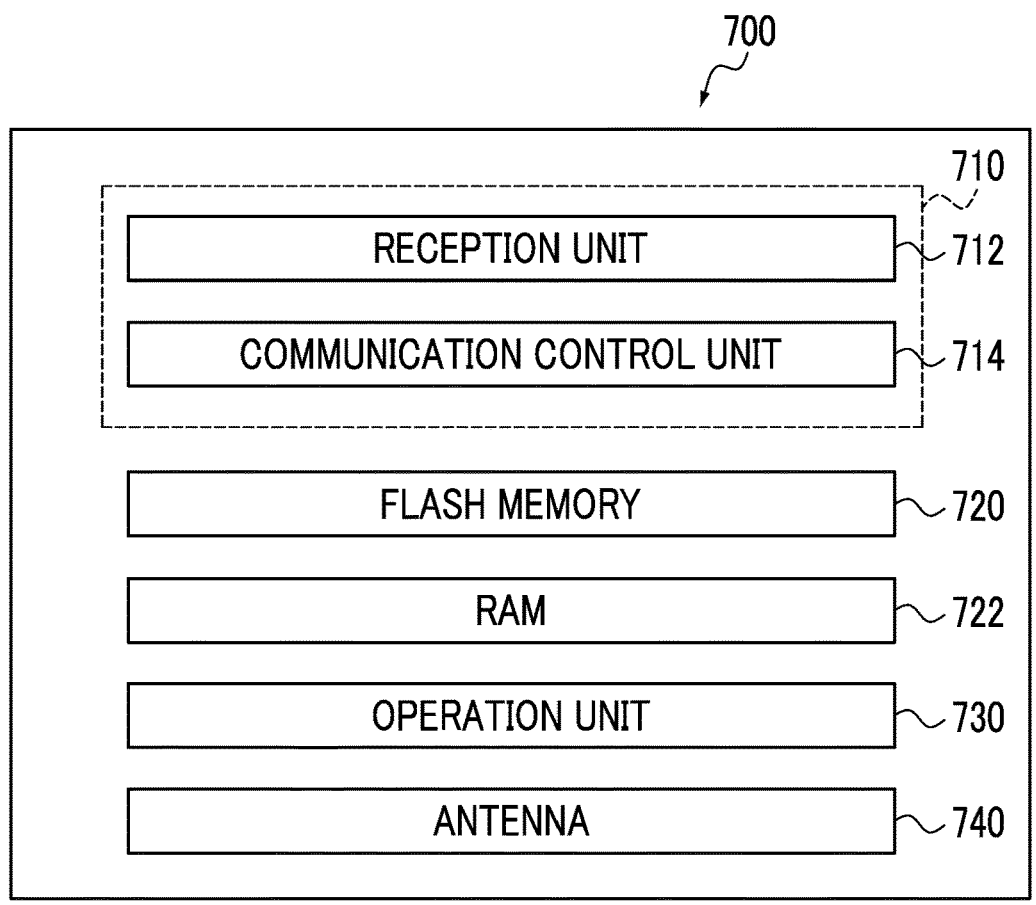
FIG. 16 is a diagram showing a configuration of the remote controller.

As shown in FIG. 16, the remote controller 700 comprises a processor 710 (processor) including a reception unit 712 and a communication control unit 714, a flash memory 720, a RAM 722, an operation unit 730, and an antenna 740 for wireless communication. The user operates the operation unit 730 (buttons or switches) to perform various operations (imaging parameter setting instruction, recording start/end instruction for moving image, and the like), and the reception unit 712 receives the operation. The communication control unit 714 issues an instruction to the imaging device 100 according to the imaging program stored in the flash memory 720 (non-transitory recording medium, memory). The imaging instruction program causes the processor 710 to execute the imaging instruction (first to third instructions; each piece of processing of the imaging method according to the present invention) to the imaging unit (specifically, each unit of the imaging element 310 and the processor 330) of the imaging device 100. During the processing, the RAM 722 is used as a work area and a temporary recording area (including an area used as a memory). Each piece of processing of the imaging method is the same as that of Examples 1 to 3. The communication between the remote controller 700 and the imaging device 100 may be wired.

Even with such a configuration, the user can easily capture a moving image under a desired imaging condition as in the above aspect.

Second Embodiment

Although the imaging device 100 which is a digital camera is described in the first embodiment, the configuration of the imaging device is not limited thereto. Another imaging device may be, for example, a built-in type or external type camera for personal computer (PC) or a mobile terminal device having an imaging function as described below.

Examples of the mobile terminal device which is an embodiment of the imaging device according to the present invention include mobile phones or smartphones, personal digital assistant (PDA), portable game machines, and smartwatches. Hereinafter, a smartphone will be described as an example in detail with reference to drawings.

Figure 17A:
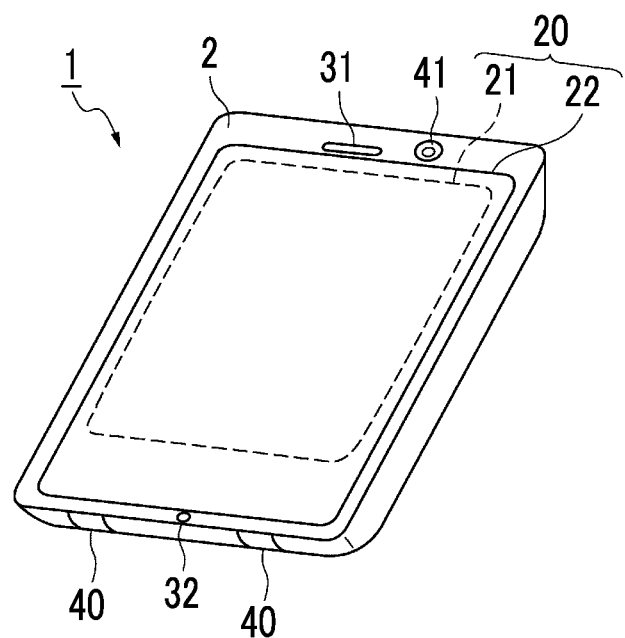
FIGS. 17A and 17B are external views of a smartphone according to a second embodiment.
Figure 17B:
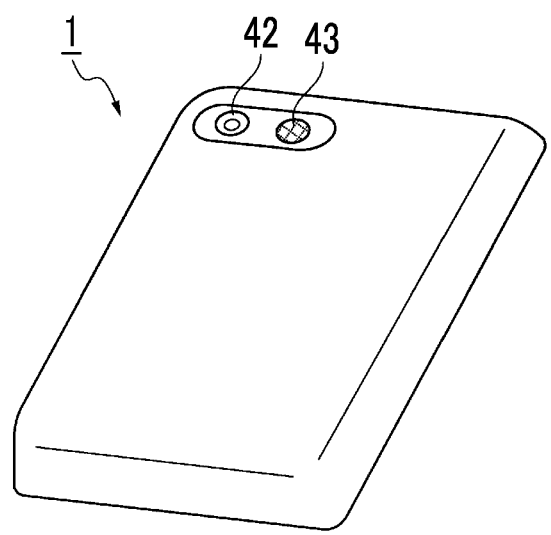

FIGS. 17A and 17B are external views of a smartphone 1 (imaging device) according to a second embodiment. FIG. 17A is a front view, and FIG. 17B is a rear view. The smartphone 1 shown in FIGS. 17A and 17B has a flat housing 2 and comprises a display input unit 20 in which a display panel 21 (display device) as a display unit and an operation panel 22 (operation unit) as an input unit are integrated on one surface of the housing 2. Further, the housing 2 comprises a speaker 31 (speaker), a microphone 32, an operation unit 40 (operation unit), camera units 41 and 42 (imaging device), and a strobe 43. A configuration of the housing 2 is not limited thereto. For example, a configuration in which the display unit and the input unit are independent may be employed, or a configuration having a folding structure or a slide mechanism may be employed.

Figure 18:
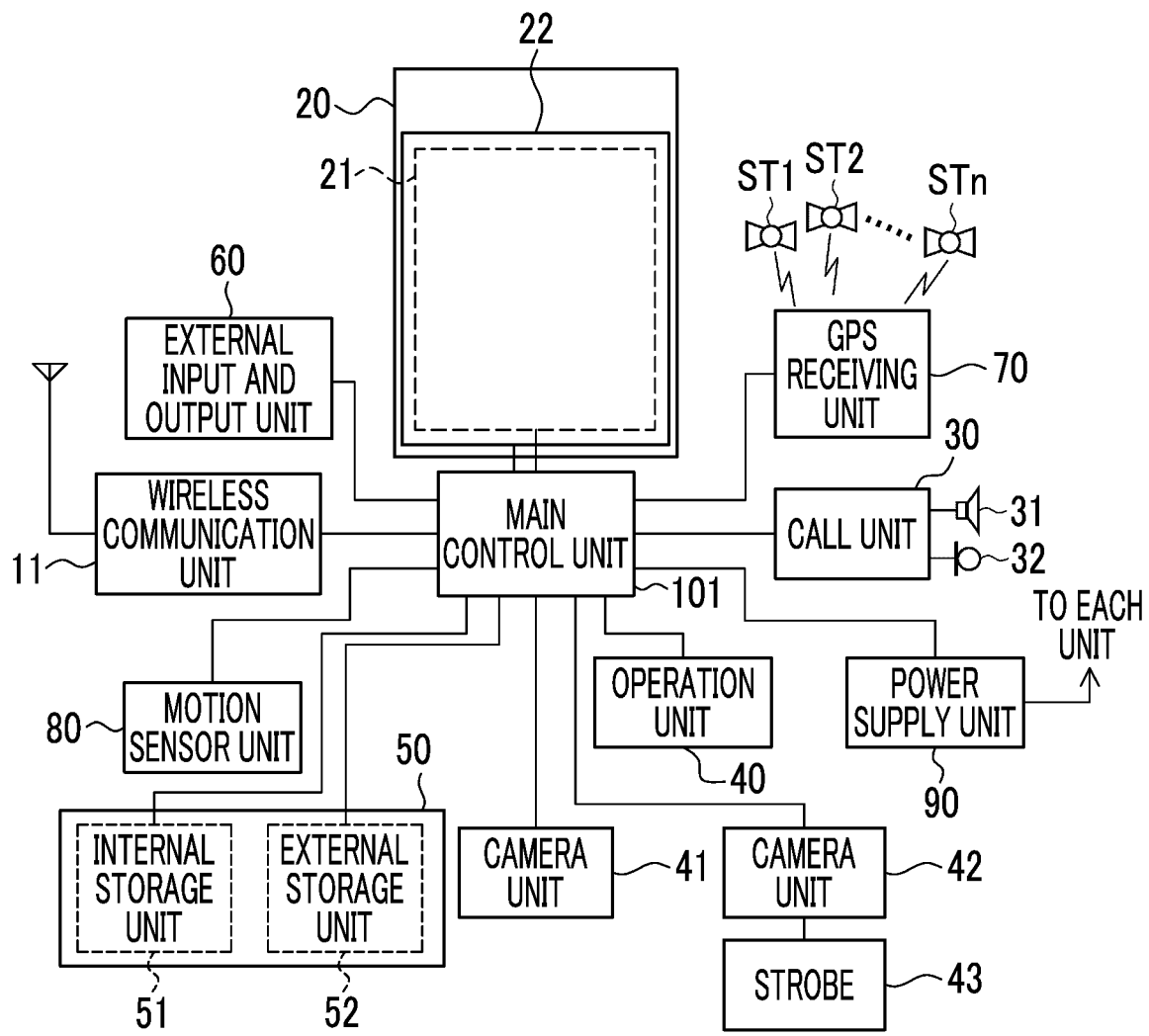
FIG. 18 is a diagram showing a schematic configuration of the smartphone.

FIG. 18 is a diagram showing a schematic configuration of the smartphone 1. As shown in FIG. 18, the smartphone 1 comprises a wireless communication unit 11, the display input unit 20, a call unit 30, the operation unit 40, the camera units 41 and 42, the strobe 43, a storage unit 50, an external input and output unit 60, a global positioning system (GPS) receiving unit 70, a motion sensor unit 80, and a power supply unit 90. Further, the smartphone 1 comprises a main control unit 101 (processor). A wireless communication function for performing mobile wireless communication via a base station device and a mobile communication network is provided as a main function of the smartphone 1.

The wireless communication unit 11 performs wireless communication with the base station device accommodated in the mobile communication network in response to an instruction from the main control unit 101. Using such wireless communication, various pieces of file data such as voice data and image data, e-mail data, and the like are transmitted and received, and Web data, streaming data, and the like are received.

The display input unit 20 is a so-called touch panel in which an image (still image and/or moving image), character information, or the like is displayed to visually transmit information to the user and a user operation on the displayed information is detected under control of the main control unit 101, and comprises the display panel 21 and the operation panel 22.

In the display panel 21, a liquid crystal display (LCD), an organic light-emitting diode (OLED), or the like is used as a display device. The operation panel 22 is a device that is placed such that an image displayed on a display surface of the display panel 21 is visually recognizable and detects one or a plurality of coordinates operated by a finger of the user or a conductor such as a pen. In a case where such a device is operated by the finger of the user or the conductor such as the pen, the operation panel 22 outputs, to the main control unit 101, a detection signal generated due to the operation. Next, the main control unit 101 detects an operation position (coordinates) on the display panel 21 based on the received detection signal.

As shown in FIGS. 17A and 17B, although the display panel 21 and the operation panel 22 of the smartphone 1 exemplified as an embodiment of the imaging device of the present invention integrally constitute the display input unit 20, the operation panel 22 is disposed so as to completely cover the display panel 21. In a case where such a disposition is employed, the operation panel 22 may comprise a function of detecting the user operation even in an area outside the display panel 21. In other words, the operation panel 22 may comprise a detection area (hereinafter referred to as display area) for an overlapping portion that overlaps the display panel 21 and a detection area (hereinafter referred to as non-display area) for the other outer edge portion that does not overlap the display panel 21.

The call unit 30 comprises the speaker 31 and the microphone 32. The call unit 30 can convert a voice of the user input through the microphone 32 into voice data that can be processed by the main control unit 101 and output the converted voice data to the main control unit 101, and can decode the voice data received by the wireless communication unit 11 or the external input and output unit 60 and output the decoded voice data from the speaker 31. Further, as shown in FIGS. 17A and 17B, it is possible to mount the speaker 31 on the same surface as a surface on which the display input unit 20 is provided, and to mount the microphone 32 on a side surface of the housing 2, for example.

The operation unit 40 is a hardware key using a key switch or the like and a device that receives the instruction from the user. For example, as shown in FIGS. 17A and 17B, the operation unit 40 is a push-button type switch that is mounted on the side surface of the housing 2 of the smartphone 1, is turned on in a case of being pressed with a finger or the like, and is turned off by restoring force of a spring or the like in a case where the finger is released.

The storage unit 50 (recording unit, recording destination, memory) stores a control program (for example, imaging instruction program causing the main control unit 101 to execute the imaging instruction method according to the present embodiment) or control data (may include the information such as the first time, the second time, and the like described above) of the main control unit 101, application software, address data in which a name, a telephone number, and the like of a communication partner are associated, data of transmitted and received e-mails, Web data downloaded by Web browsing, or downloaded content data, and temporarily stores streaming data or the like. Further, the storage unit 50 stores the moving image data (first moving image data, second moving image data) captured by the imaging method of the present embodiment. The storage unit 50 is configured of an internal storage unit 51 built into the smartphone and an external storage unit 52 having a slot for an attachable and detachable external memory. Each of the internal storage unit 51 and the external storage unit 52 constituting the storage unit 50 is formed by using a known storage medium.

The external input and output unit 60 (first connection unit, second connection unit) serves as an interface with all external devices (including external recording device and external display device) connected to the smartphone 1. The smartphone 1 is directly or indirectly connected to another external device via the external input and output unit 60 by communication or the like. Examples of the units for communication and the like include a universal serial bus, an IEEE 1394, and a network (for example, a wired LAN or a wireless LAN). Further, Bluetooth (registered trademark), radio frequency identification (RFID), infrared data association (registered trademark), and the like can be mentioned as the units for communication and the like. Furthermore, ultra wide band (UWB) (registered trademark), ZigBee (registered trademark), and the like can also be mentioned as the units for communication and the like.

Examples of the external device connected to the smartphone 1 include a wired/wireless headset, a wired/wireless external charger, and a wired/wireless data port. Further, an external recording device (external recording device, recording destination) such as a memory card or a subscriber identity module (SIM) card/user identity module (UIM) card connected via a card socket can also be mentioned as an external device. Further, the external device connected thereto includes external audio and video devices connected via audio and video input/output (I/O) terminals, external audio and video devices wirelessly connected, smartphones wired/wirelessly connected, PDAs wired/wirelessly connected, personal computers wired/wirelessly connected, and earphones. The external input and output unit 60 can transmit the data transmitted from such an external device to each component inside the smartphone 1 or can transmit the data inside the smartphone 1 (including first moving image data, second moving image data) to the external device. Further, the external input and output unit 60 causes an external display device (large-sized display or the like; external display device, display destination) connected to the smartphone 1 to display a moving image (first moving image data, second moving image data).

The motion sensor unit 80 comprises, for example, a triaxial acceleration sensor or an inclination sensor and detects a physical movement of the smartphone 1 in response to the instruction from the main control unit 101. With the detection of the physical movement of the smartphone 1, a moving direction, acceleration, or posture of the smartphone 1 is detected. Such a detection result is output to the main control unit 101. The power supply unit 90 supplies electric power accumulated in a battery (not shown) to each unit of the smartphone 1 in response to the instruction from the main control unit 101.

The main control unit 101 comprises a microprocessor and a memory such as RAM or flash memory, and operates according to the control program or the control data stored in the storage unit 50 to integrally control each unit of the smartphone 1 including the camera unit 41. The information such as a repetition pattern of the I frame and the P frame may be stored in the memory of the main control unit 101. The main control unit 101 has a mobile communication control function for controlling each unit of a communication system and an application processing function for performing voice communication or data communication through the wireless communication unit 11.

The main control unit 101 also has an image processing function such as displaying a moving image on the display input unit 20 based on the image data (data of still image or moving image) such as received data or downloaded streaming data. The image processing function means a function of the main control unit 101 decoding the image data, performing the image processing on such a decoding result, and displaying an image on the display input unit 20.

The camera units 41 and 42 are digital cameras (imaging devices) that perform electronic imaging using the imaging element such as CMOS or CCD. Further, the camera units 41 and 42 can convert the image data (moving image, still image) obtained by imaging into compressed image data such as MPEG or JPEG, under the control of the main control unit 101, and record the converted image data in the storage unit 50 or output the converted image data through the external input and output unit 60 or the wireless communication unit 11 (in a case of such compression or recording, the setting of the first/second imaging parameters, the imaging of the first/second moving image data, and the compression, recording, and display of the image data, and the like can be performed by the imaging instruction method of the present embodiment, as in the first embodiment). In the smartphone 1 shown in FIGS. 17 and 18, one of the camera units 41 and 42 can be used for imaging, or the camera units 41 and 42 can be used at the same time for imaging. In a case where the camera unit 42 is used, the strobe 43 can be used.

The camera units 41 and 42 can be used for various functions of the smartphone 1. For example, the smartphone 1 can display images acquired by the camera units 41 and 42 on the display panel 21. Further, the smartphone 1 can use the images of the camera units 41 and 42 as one of the operation inputs of the operation panel 22. Further, in a case where the GPS receiving unit 70 detects a position based on positioning information from GPS satellites ST1, ST2, . . . , and STn, the smartphone 1 detects the position by referring to the images from the camera units 41 and 42. Furthermore, the smartphone 1 can determine an optical axis direction of the camera unit 41 of the smartphone 1 or a current use environment without using the triaxial acceleration sensor or in combination with the triaxial acceleration sensor with reference to the images from the camera units 41 and 42. Of course, the smartphone 1 can use the images from the camera units 41 and 42 in the application software. Further, the smartphone 1 can add the position information acquired by the GPS receiving unit 70, voice information acquired by the microphone 32 (may be text information subjected to voice-text conversion by the main control unit or the like), posture information acquired by the motion sensor unit 80, and the like to the image data of the still image or the moving image and record the image data thereof with the added information in the storage unit 50. Further, the smartphone 1 can also output the image data of the still image or the moving image through the external input and output unit 60 and the wireless communication unit 11.

In the smartphone 1 having the above configuration, it is also possible to execute the processing (the setting of the first/second imaging parameters, the imaging of the first/second moving image data, and the compression, recording, and display of the image data, and the like) of the imaging method and the imaging program according to the present embodiment, as in the imaging device 100 according to the first embodiment. Specifically, the processing executed by the processor 330 (each unit shown in FIG. 5) in the first embodiment can be executed mainly by the camera units 41 and 42 and the main control unit 101 in the smartphone 1. In addition, the functions of the operation unit 350, the recording device 360, the monitor 370, and the speaker 380 in the first embodiment can be respectively realized by the operation unit 40, the storage unit 50 and the operation panel 22, the display panel 21 and the operation panel 22, and the speaker 31 in the smartphone 1.

Accordingly, it is also possible to obtain the same effect (the user can easily capture a moving image under a desired imaging condition) as in the imaging device 100 according to the first embodiment in the smartphone 1 according to the second embodiment.

Although the embodiments of the present invention have been described above, the present invention is not limited to the above aspects, and various modifications can be made without departing from the spirit of the present invention.

EXPLANATION OF REFERENCES

1: smartphone
2: housing
11: wireless communication unit
20: display input unit
21: display panel
22: operation panel
30: call unit
31: speaker
32: microphone
40: operation unit
41: camera unit
42: camera unit
43: strobe
50: storage unit
51: internal storage unit
52: external storage unit
60: external input and output unit
70: GPS receiving unit
80: motion sensor unit
90: power supply unit
100: imaging device 101: main control unit
200: interchangeable lens
210: zoom lens
220: stop
230: focus lens
240: lens drive unit
300: imaging device body
301: mount
302: terminal
303: finder window
304: finder eyepiece portion
310: imaging element
312: light receiving unit
314: analog amplification unit
316: A/D converter
318: imaging element drive unit
320: digital signal processing unit
330: processor
332: reception unit
334: imaging parameter setting unit
336: imaging control unit
338: image processing unit
340: compression processing unit
342: recording control unit
344: display control unit
345: communication control unit
346: lens drive control unit
348: flash memory
349: RAM
350: operation unit
351: release button
352: dial
353: function button
354: exposure correction dial
355: BACK key
356: MENU/OK key
357: cross key
358: Q button
360: recording device
370: monitor
380: speaker
390: antenna
395: external output unit
500: moving image
500A: region
500B: region
510: moving image
510A: region
520: moving image
520A: region
530: moving image
530A: region
530B: region
540: moving image
540A: region
542: moving image
542A: region
544: moving image
544A: region
546: moving image
546A: region
548: moving image
548A: region
550: moving image
550A: region
552: moving image
552A: region
700: remote controller
710: processor
712: reception unit
714: communication control unit
720: flash memory
722: RAM
730: operation unit
740: antenna
L: optical axis
ST1: GPS satellite
ST2: GPS satellite

What is claimed is:

1. An imaging device comprising:
an imaging unit; and
a processor configured to:
set a first imaging parameter applied to moving image data captured by the imaging unit;
output first moving image data captured based on the first imaging parameter to a recording destination before a first operation is received;
set a second imaging parameter applied to the moving image data in a case where the first operation is received;
output the first moving image data to the recording destination from the reception of the first operation to a reception of a second operation; and
output second moving image data captured based on the second imaging parameter to the recording destination, instead of the first moving image data captured based on the first imaging parameter, in a case where the second operation,
wherein the first imaging parameter and the second imaging parameter are imaging parameters related to exposure, and
in a case where exposure correction for darkening moving image data by the first operation is received, in a period from the reception of the first operation to the reception of the second operation,
the processor lowers sensitivity when the moving image data captured by the imaging unit is taken in, as compared with sensitivity before the exposure correction,
outputs moving image data generated by applying the second imaging parameter to the taken-in moving image data to a display destination as the second moving image data,
creates moving image data having the same brightness as before the exposure correction by multiplying the taken-in moving image data by a gain, and
outputs the created moving image data to the recording destination as the first moving image data.

2. An imaging device comprising:
an imaging unit,
a memory that temporarily saves moving image data output from the imaging unit, and
a processor configured to:
set a first imaging parameter applied to moving image data captured by the imaging unit;
output first moving image data captured based on the first imaging parameter to a recording destination before a first operation is received;
set a second imaging parameter applied to the moving image data in a case where the first operation is received;
save the moving image data in the memory in a period from the reception of the first operation to a reception of a second operation; and output second moving image data generated based on the saved moving image data to the recording destination after the second operation is received, wherein during a period between the first operation and the second operation, a moving image captured by the first imaging parameter is output to a non-transitory and tangible recording medium while a moving image captured by the second imaging parameter is temporarily saved to the memory.

3. The imaging device according to claim 2, wherein the processor outputs, to the recording destination, moving image data generated by applying the first imaging parameter to the moving image data saved in the memory as the first moving image data in a case where a remaining capacity of the memory becomes equal to or less than a threshold value before the second operation is received, and generates the second moving image data by applying the second imaging parameter to moving image data after moving image data acquired at an earliest time among the moving image data saved in the memory and outputs the generated second moving image data to the recording destination in a case where the second operation is received.

4. The imaging device according to claim 2, wherein the processor outputs the first moving image data to a display destination before the first operation is received, and outputs at least the second moving image data to the display destination after the first operation is received.

5. The imaging device according to claim 4, wherein the processor further outputs the first moving image data to the display destination in a period from the reception of the first operation to the reception of the second operation.

6. The imaging device according to claim 4, wherein the processor outputs only the second moving image data to the display destination after the second operation is received.

7. The imaging device according to claim 4, wherein the processor outputs a partial region of the moving image data to the display destination as the first moving image data and outputs another partial region of the moving image data to the display destination as the second moving image data in a period from the reception of the first operation to the reception of the second operation.

8. The imaging device according to claim 5, wherein the processor outputs the first moving image data to a partial region of the second moving image data in a period from the reception of the first operation to the reception of the second operation.

9. The imaging device according to claim 5, wherein the processor outputs the first moving image data and the second moving image data in parallel in a period from the reception of the first operation to the reception of the second operation.

10. The imaging device according to claim 5, wherein the processor in a case where the first operation is received, outputs moving image data based on a plurality of selectable imaging parameters as a list to the display destination, receives an operation of selecting one piece of moving image data from the moving image data output as a list as the second operation, and sets an imaging parameter corresponding to the selected moving image data as the second imaging parameter.

11. The imaging device according to claim 2, wherein the processor changes the first imaging parameter over a plurality of times to switch the first imaging parameter to the second imaging parameter and outputs moving image data corresponding to an imaging parameter during the switching period to the recording destination as the second moving image data.

12. The imaging device according to claim 2, wherein the first imaging parameter and the second imaging parameter are imaging parameters related to white balance.

13. The imaging device according to claim 2, wherein the first imaging parameter and the second imaging parameter are imaging parameters related to exposure, and in a case where exposure correction for darkening moving image data by the first operation is received, in a period from the reception of the first operation to the reception of the second operation, the processor lowers sensitivity when the moving image data captured by the imaging unit is taken in, as compared with sensitivity before the exposure correction, outputs moving image data generated by applying the second imaging parameter to the taken-in moving image data to a display destination as the second moving image data, creates moving image data having the same brightness as before the exposure correction by multiplying the taken-in moving image data by a gain, and outputs the created moving image data to the recording destination as the first moving image data.

14. The imaging device according to claim 13, wherein the processor shortens an exposure time in a case where the moving image data is captured to darken the moving image data in a case where the lowering of the sensitivity in the case of the taking-in is not possible.

15. The imaging device according to claim 14, wherein the processor acquires the moving image data for a plurality of frames by increasing a frame rate of the moving image data and shortening the exposure time as compared with before the exposure correction, displays moving image data generated by averaging the moving image data for the plurality of frames on the display destination as the second moving image data, and outputs moving image data generated by multiplying the generated moving image data by a gain or adding the moving image data for the plurality of frames to the generated moving image data to the recording destination as the first moving image data.

16. The imaging device according to claim 5, wherein in a case where exposure correction for brightening moving image data by the first operation is received, the processor, in a period from the reception of the first operation to the reception of the second operation, outputs moving image data generated by multiplying the moving image data captured by the imaging unit by a gain to the display destination as the second moving image data.

17. The imaging device according to claim 2, further comprising:
a recording unit; and/or
a first connection unit connected to an external recording device,
wherein the processor records the first moving image data and the second moving image data using the recording unit as the recording destination and/or records the first moving image data and the second moving image data via the first connection unit using the external recording device as the recording destination.

18. The imaging device according to claim 4, further comprising:
a display unit; and/or
a second connection unit connected to an external display device,
wherein the processor displays the first moving image data and/or the second moving image data using the display unit as the display destination and/or displays the first moving image data and/or the second moving image data via the second connection unit using the external display device as the display destination.

19. An imaging method by an imaging device including an imaging unit, a processor and a memory that temporarily saves moving image data output from the imaging unit, the imaging method comprising:

setting, by the processor, a first imaging parameter applied to moving image data captured by the imaging unit;
outputting, by the processor, first moving image data captured based on the first imaging parameter to a recording destination before a first operation is received;
setting, by the processor, a second imaging parameter applied to the moving image data in a case where the first operation is received;
saving, by the processor, the moving image data in the memory in a period from the reception of the first operation to a reception of a second operation; and
outputting, by the processor, second moving image data generated based on the saved moving image data to the recording destination after the second operation is received,
wherein during a period between the first operation and the second operation, a moving image captured by the first imaging parameter is output to a non-transitory and tangible recording medium while a moving image captured by the second imaging parameter is temporarily saved to the memory.

20. A non-transitory, computer-readable tangible recording medium which records thereon a program for causing a processor of an imaging device including the processor, an imaging unit and a memory that temporarily saves moving image data output from the imaging unit, to execute the imaging method according to claim 19.

* * * * *